US 12,032,176 B2
Jul. 9, 2024

(12) United States Patent
Kwon

(10) Patent No.: US 12,032,176 B2
(45) Date of Patent: Jul. 9, 2024

(54) CAMERA MODULE

(71) Applicant: SAMSUNG ELECTRO-MECHANICS CO., LTD., Suwon-si (KR)

(72) Inventor: Young Hwan Kwon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 194 days.

(21) Appl. No.: 17/577,698

(22) Filed: Jan. 18, 2022

(65) Prior Publication Data

US 2022/0252895 A1 Aug. 11, 2022

(30) Foreign Application Priority Data

Feb. 9, 2021 (KR) .................. 10-2021-0018459
Jun. 11, 2021 (KR) .................. 10-2021-0075973

(51) Int. Cl.
G02B 27/64 (2006.01)
G02B 7/18 (2021.01)
G02B 13/00 (2006.01)
G03B 5/00 (2021.01)
G03B 17/17 (2021.01)
H01F 7/08 (2006.01)

(52) U.S. Cl.
CPC ............ *G02B 27/646* (2013.01); *G02B 7/18* (2013.01); *G02B 13/0065* (2013.01); *G03B 5/00* (2013.01); *G03B 17/17* (2013.01); *H01F 7/081* (2013.01); *G03B 2205/0007* (2013.01); *G03B 2205/0023* (2013.01); *G03B 2205/0069* (2013.01)

(58) Field of Classification Search
None
See application file for complete search history.

(56) References Cited

U.S. PATENT DOCUMENTS 10,516,773 B2  12/2019  Yoon et al.
10,866,430 B2  12/2020  Kim et al.
11,493,741 B2  11/2022  Kwon et al.
11,609,436 B2   3/2023  Seo et al.
(Continued)

FOREIGN PATENT DOCUMENTS

CN   107925717 A   4/2018
CN   207424496 U   5/2018
(Continued)

OTHER PUBLICATIONS

Chinese Office Action issued on Mar. 29, 2024, in counterpart Chinese Patent Application No. 202210117573.7 (10 pages in English, 13 pages in Chinese).

*Primary Examiner* — Derek S. Chapel
(74) *Attorney, Agent, or Firm* — NSIP Law

(57) ABSTRACT

A camera module includes: a housing; a rotation holder configured to tilt about an axis perpendicular to an optical axis with respect to the housing, and accommodating a reflective member; a first magnetic member disposed in the rotation holder; a middle guide disposed between the housing and the rotation holder; and a first ball group including three ball members disposed between the rotation holder and the middle guide. An inner region of a triangle connecting the three ball members of the first ball group to one another and the first magnetic member overlap each other in a direction of the optical axis.

20 Claims, 17 Drawing Sheets

(56) References Cited

U.S. PATENT DOCUMENTS

| | | | |
|---|---|---|---|
| 2018/0109660 A1* | 4/2018 | Yoon | H04N 23/687 |
| 2019/0049687 A1 | 2/2019 | Bachar et al. | |
| 2019/0121103 A1 | 4/2019 | Bachar et al. | |
| 2019/0129197 A1* | 5/2019 | Kim | G02B 27/646 |
| 2020/0310079 A1 | 10/2020 | Park et al. | |
| 2020/0363614 A1 | 11/2020 | Kwon et al. | |
| 2020/0363626 A1* | 11/2020 | Seo | G03B 30/00 |
| 2022/0279093 A1 | 9/2022 | Kwon et al. | |

FOREIGN PATENT DOCUMENTS

| | | | |
|---|---|---|---|
| CN | 109725474 A | 5/2019 | |
| CN | 209590407 U | 11/2019 | |
| CN | 111936908 A | 11/2020 | |
| CN | 111948780 A | 11/2020 | |
| CN | 111948881 A | 11/2020 | |
| EP | 3 584 624 A1 | 12/2019 | |
| KR | 10-2018-0003539 A | 1/2018 | |
| KR | 10-2018-0063404 A | 6/2018 | |
| KR | 10-2018-0120894 A | 11/2018 | |
| KR | 10-2020-0116402 A | 10/2020 | |
| KR | 10-2020-0132562 A | 11/2020 | |
| KR | 10-2020-0132626 A | 11/2020 | |
| KR | 10-2021-0077656 A | 6/2021 | |
| WO | WO 2019/207464 A2 | 10/2019 | |
| WO | WO-2021071277 A1 * | 4/2021 | G02B 26/08 |

* cited by examiner

CAMERA MODULE

CROSS-REFERENCE TO RELATED APPLICATIONS

This application claims the benefit under 35 U.S.C. § 119(a) of Korean Patent Application Nos. 10-2021-0018459 and 10-2021-0075973 filed on Feb. 9, 2021 and Jun. 11, 2021, respectively, in the Korean Intellectual Property Office, the entire disclosures of which are incorporated herein by reference for all purposes.

BACKGROUND

1. Field

The following description relates to a camera module. For example, the following description relates to a folded camera module including a reflective member configured to change an optical path and optical image stabilization.

2. Description of Related Art

The supply and use of electronic devices have been rapidly increased due to remarkable developments of information and communications technology and semiconductor technology. These electronic devices do not stay in their traditional unique domains but tend to provide various functions converged to one another. For example, the electronic device may provide a camera function to generate and store an image or a video by capturing a subject.

For example, an electronic device having a camera module having a function equivalent to that of a digital camera (DSLR) has recently appeared in response to a demand for a camera of high-capacity and high-performance. The camera function provided in the electronic device may include an auto-focus function, a zoom function, an image stabilization (IS) function, etc.

The image stabilization function may all include a camera shake correction, a hand trembling correction and the like, and may prevent an image of the subject to be captured from vibrating due to unintentional hand trembling or camera shake by a photographer in a state in which the camera is moved or fixed.

This image stabilization function may be divided into an optical image stabilization (OIS) function, a digital image stabilization (DIS) function, etc. The optical image stabilization (OIS) function may be a function of correcting an image quality by, for example, moving a lens or the camera module in a direction perpendicular to an optical axis direction to correct a light path.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing; a rotation holder configured to tilt about an axis perpendicular to an optical axis with respect to the housing, and accommodating a reflective member; a first magnetic member disposed in the rotation holder; a middle guide disposed between the housing and the rotation holder; and a first ball group including three ball members disposed between the rotation holder and the middle guide. An inner region of a triangle connecting the three ball members of the first ball group to one another and the first magnetic member overlap each other in a direction of the optical axis.

The camera module may further include a second magnetic member disposed on the housing or the middle guide to face the first magnetic member.

The first ball group may be partially accommodated in a first guide groove disposed in the rotation holder or the middle guide.

The first guide groove may be extended in a circumferential direction of a first axis perpendicular to the optical axis.

The first guide groove may include three guide grooves. The three ball members of the first ball group may be respectively accommodated in the three guide grooves.

The camera module may further include a second ball group including three ball members disposed between the housing and the middle guide. An inner region of a triangle connecting the three ball members of the second ball group to one another and the first magnetic member may overlap each other in the direction of the optical axis.

The second ball group may be partially accommodated in a second guide groove disposed in the housing or the middle guide.

The second guide groove may be extended in a circumferential direction of a second axis perpendicular to the optical axis.

The three ball members of the second ball group may include a first ball member, a second ball member and a third ball member. The second guide groove may be disposed in the middle guide, and may include a 2-1-th guide groove and a 2-2-th guide groove spaced apart from and parallel to each other. The first ball member and the second ball member may be accommodated in the 2-1-th guide groove, and the third ball member may be accommodated in the 2-2-th guide groove.

The camera module ma further include an auxiliary ball member accommodated in the 2-1-th guide groove and disposed between the first ball member and the second ball member. The auxiliary ball member may have a diameter smaller than a diameter of the first ball member or the second ball member.

The camera module may further include an auxiliary ball member accommodated in the 2-2-th guide groove and disposed on one side or two sides of the third ball member. The auxiliary ball member may have a diameter smaller than a diameter of the third ball member.

The second guide groove may include three guide grooves, and the three ball members of the second ball group may be respectively accommodated in the three guide grooves.

The camera module may further include: a third magnetic member mounted on the rotation holder or the middle guide; and a fourth magnetic member mounted on the housing to face the third magnetic member.

The camera module may further include a back-yoke mounted on the housing to face the third magnetic member. The second guide groove may be disposed in the housing, and may include a 2-1-th guide groove and a 2-2-th guide groove spaced apart from and parallel to each other. Two ball members among the three ball members of the second ball group may be accommodated in the 2-1-th guide groove, and a remaining ball member among the three ball members of the second ball group y be accommodated in the 2-2-th guide groove. The back-yoke may be disposed closer to the 2-1-th guide groove than the 2-2-th guide groove.

In another general aspect, a camera module includes: a housing; a rotation holder configured to tilt about an axis perpendicular to an optical axis with respect to the housing, and accommodating a reflective member; a middle guide disposed between the housing and the rotation holder; a first magnetic member mounted on the rotation holder or the middle guide; and a ball group including three ball members disposed between the housing and the middle guide. An inner region of a triangle connecting the three ball members of the ball group to one another and the first magnetic member overlap each other in a direction of the optical axis.

The camera module may further include a second magnetic member mounted on the housing to face the first magnetic member. The ball group may be partially accommodated in a curved guide groove positioned in the housing or the middle guide.

In another general aspect, a camera module includes: a housing; a rotation holder accommodating a reflective member; a first magnetic member disposed in the rotation holder; a second magnetic member disposed in the housing to face the first magnetic member; a middle guide disposed between the housing and the rotation holder; and ball members disposed between the rotation holder and the middle guide or between the housing and the middle guide, and configured to guide tilting of the rotation holder about an axis perpendicular to an optical axis with respect to the housing. A pulling force generated by the first and second magnetic members is centered at an inner region of a triangle connecting the three ball members among the ball members to one another.

The pulling force may pull the rotation holder and the middle guide toward the housing.

The ball members may be disposed between the rotation holder and the middle guide, and may be disposed in arc-shaped guide grooves in the rotation holder or the middle guide.

The ball members may be disposed between the housing and the rotation holder, and may be disposed in arc-shaped guide grooves in the housing or the rotation holder.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
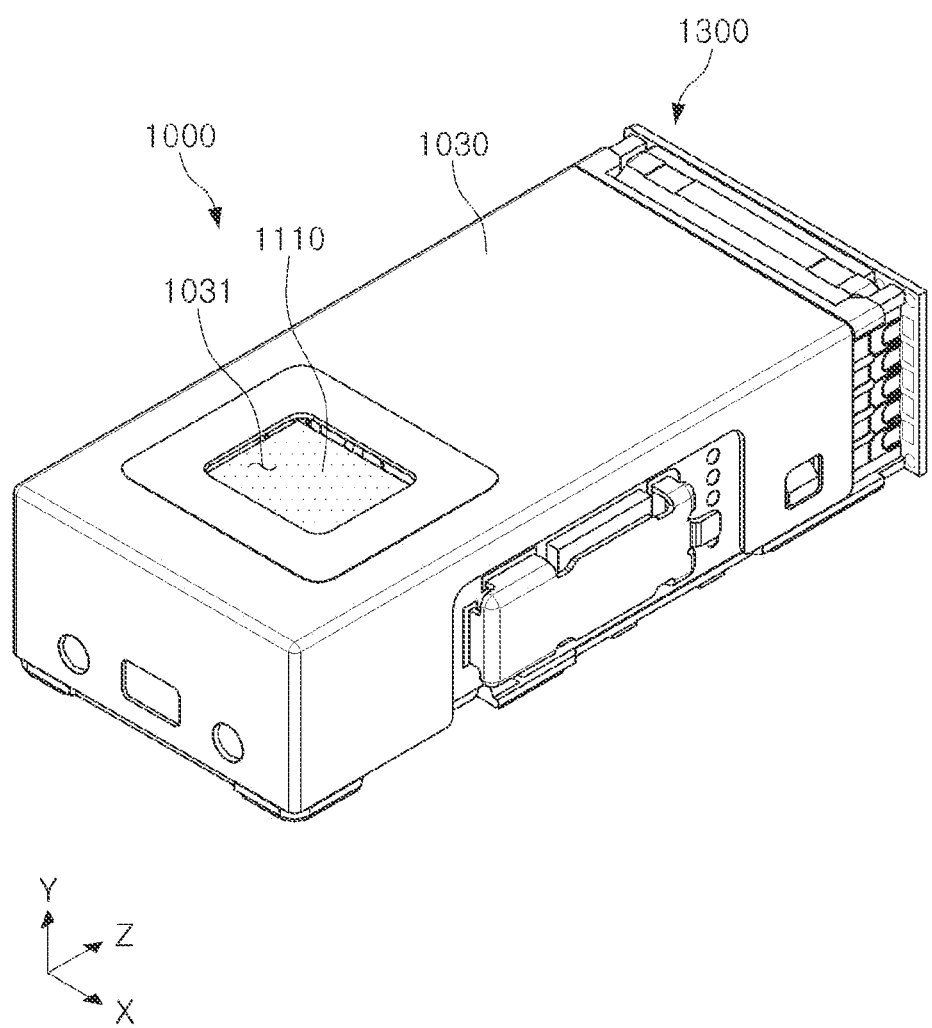
FIG. 1 is a perspective view of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
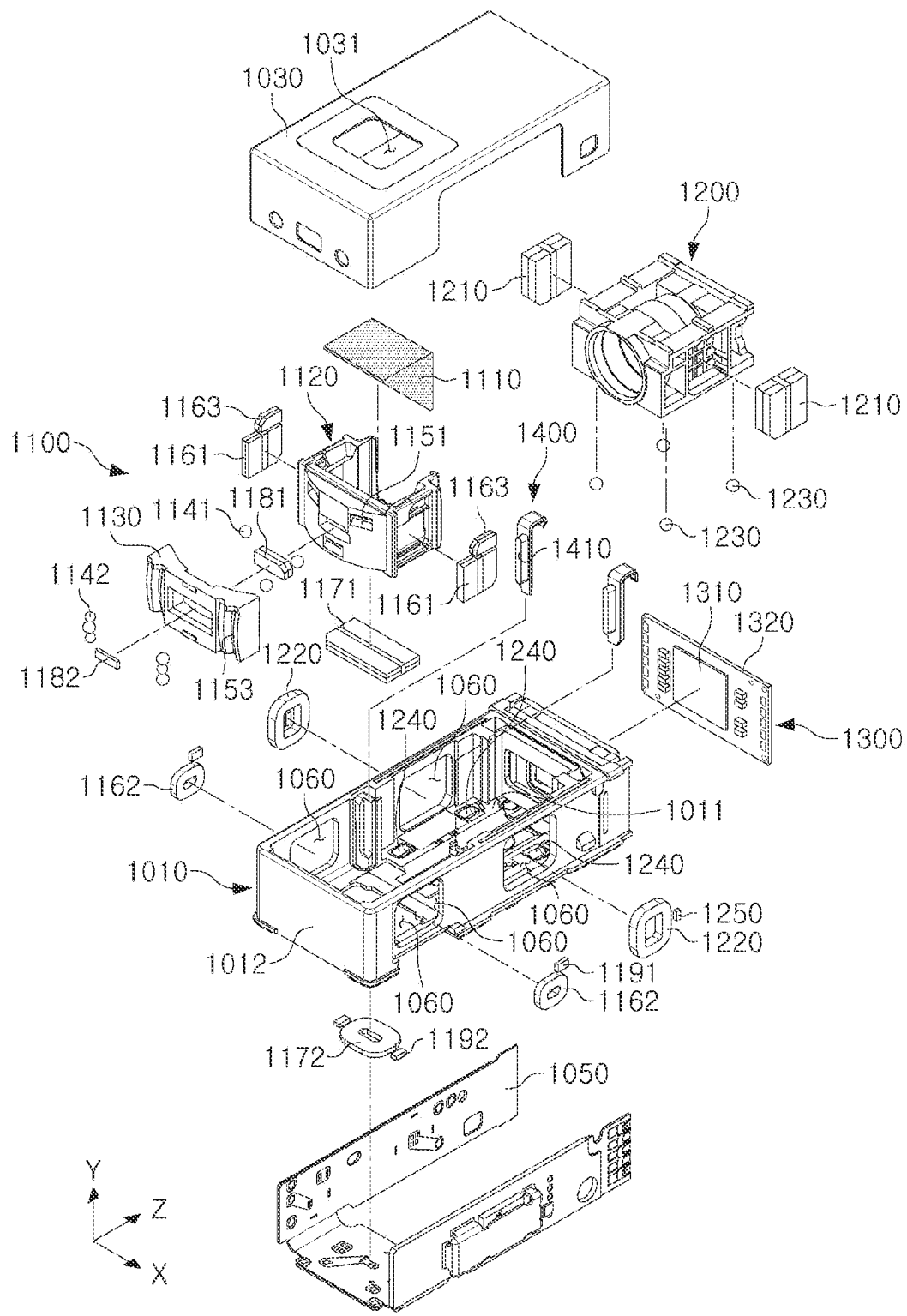
FIG. 2 is an exploded perspective view of the camera module of FIG. 1, according to an embodiment.

FIG. 1 is a perspective view of a camera module 1000, according to an embodiment. FIG. 2 is a perspective view of the camera module 1000.

The camera module 1000 may include, for example, a folded module 1100, a lens module 1200, and an image sensor module 1300. The folded module 1100 and the lens module 1200 may be accommodated in a housing 1010. A cover 1030 may partially surround upper and side surfaces of the housing 1010, and partially form an external appearance of the camera module 1000.

The folded module 1100 may change a direction of light. That is, light entering the camera through an opening 1031 of the cover 1030 may be reflected by the folded module 1100 toward the lens module 1200. In an embodiment, the folded module 1100 may include a reflective member 1110, and the reflective member 1110 may have a shape of a prism or a mirror.

The lens module 1200 may include at least one lens, and light reflected from folded module 1100 may be refracted while passing through the lens module 1200. The light passing through the lens module 1200 may be incident on an image sensor 1310. In example in which the lens module includes a plurality of lenses, the plurality of lenses may be arranged in an optical axis direction.

The image sensor module 1300 may include the image sensor 1310 and a substrate 1320 on which the image sensor 1310 is mounted. When an image is formed on an imaging surface of the image sensor 1310, the image sensor 1310 may generate an image signal for the formed image in response thereto, and the image signal may be transmitted to an external circuit through the substrate 1320.

The camera module 1000 may provide an auto-focus (hereinafter, 'AF') function and an optical image stabilization (hereinafter, 'OIS') function.

The lens module 1200 may adjust a focal length while performing a reciprocating motion along an optical axis. In an embodiment, an AF driver may be disposed in a side of the lens module 1200. For example, in an embodiment, an AF magnet 1210 may be mounted on the lens module 1200, and an AF coil 1220 may be disposed facing the AF magnet 1210. The lens module 1200 may be moved along the optical axis by an electromagnetic interaction between the AF coil 1220 and the AF magnet 1210. The AF coil 1220 may be attached to a substrate 1050 attached to the housing 1010, and the housing 1010 may include an opening 1060 to allow the AF coil 1220 and the AF magnet 1210 to face each other.

To enable smooth movement of the lens module 1200, the lens module 1200 may include ball members 1230 disposed between the lens module 1200 and a bottom surface 1011 of the housing 1010. The lens module 1200 and the bottom surface 1011 of the housing 1010 may include a guide groove 1240 partially accommodating the ball member 1230. The guide groove 1240 may be extended in a direction parallel to the optical axis direction, and a movement direction of the ball member 1230 may be limited to the direction (i.e., optical axis direction) in which the guide groove 1240 is extended.

A pulling member configured to pull the lens module 1200 to the bottom surface 1011 of the housing 1010 may be disposed between the lens module 1200 and the housing 1010. In an embodiment, the pulling member may include the AF magnet 1210 and a yoke disposed on the bottom surface 1011 of the housing 1010. In another embodiment, a separate magnet distinguished from the AF magnet 1210 may be mounted on a lower surface of the lens module 1200, and the yoke may be disposed facing the separate magnet.

The lens module 1200 may be pulled to the bottom surface 1011 of the housing 1010 by a magnetic attraction between the yoke and the AF magnet 1210 (or the separate magnet). Accordingly, the ball member 1230 may maintain close contact between the lens module 1200 and the guide groove 1240 in the bottom surface 1011 of the housing 1010, which allows the lens module 1200 to be smoothly moved in the optical axis direction. That is, the pulling member may prevent the lens module 1200 from being moved in a direction (e.g., Y-axis direction or X-axis direction) other than the optical axis direction, and may contribute to improving a performance of the AF function.

In an embodiment, a position sensor 1250 measuring a position of the lens module 1200 in the optical axis direction may be disposed inside or outside the AF coil.

The OIS function may be implemented when the folded module 1100 is rotated about an axis perpendicular to the optical axis.

In an embodiment, the folded module 1100 may include an OIS driver rotating the reflective member 1110 about the axis perpendicular to the optical axis with respect to the housing 1010. In an embodiment, the OIS driver may include a first OIS driver configured to rotate the reflective member 1110 about a first axis perpendicular to the optical axis, and a second OIS driver configured to rotate the reflective member 1110 about a second axis perpendicular to the optical axis and intersecting the first axis. For example, the optical axis may be parallel to a Z axis, the first axis may be parallel to a Y axis, and the second axis may be parallel to an X axis.

The OIS driver may allow the reflective member 1110 to be rotated about the first axis and/or the second axis, thereby optically correcting the unstable image formed on the image sensor 1310 when the camera module 1000 is shaken.

In an embodiment, the first OIS driver may be disposed on each side of the rotation holder 1120. In an embodiment, the first OIS driver may include a first OIS magnet 1161 mounted on each side of the rotation holder 1120 and a first OIS coil 1162 disposed facing the first OIS magnet 1161. The first OIS coil 1162 may be fixedly coupled to the housing 1010, and the rotation holder 1120 may be rotated about the first axis perpendicular to the optical axis with respect to the housing 1010 by an electromagnetic interaction between the first OIS coil 1162 and the first OIS magnet 1161.

In an embodiment, the second OIS driver may be disposed under the rotation holder 1120. In an embodiment, the second OIS driver may include a second OIS magnet 1171 mounted on a bottom of the rotation holder 1120 and a second OIS coil 1172 disposed facing the second OIS magnet 1171 (i.e., on the bottom surface 1011 of the housing 1010). The second OIS coil 1172 may be fixedly coupled to the housing 1010, and the rotation holder 1120 may be rotated about the second axis perpendicular to the optical axis with respect to the housing 1010 by an electromagnetic interaction between the second OIS coil 1172 and the second OIS magnet 1171.

In an embodiment, the first OIS coil 1162 and the second OIS coil 1172 may be attached to the substrate 1050, and the substrate 1050 may be fixed to the housing 1010. In an embodiment, the housing 1010 may include the openings 1060 exposing the first OIS coil 1162 and the second OIS coil 1172 to the inside of the housing 1010.

In an embodiment, position sensors 1191 and 1192 configured to measure a rotation angle of the rotation holder 1120 may be disposed inside or outside the coil. The positions of the position sensors 1191 and 1192 with respect to the OIS magnets 1161 and 1171 may each be changed as a middle guide 1130 (or rotation holder 1120) is rotated, and, thus, a rotational displacement of the middle guide 1130 (or rotation holder 1120) may be measured based on this position change. The position sensors 1191 and 1192 may each be disposed inside or outside the OIS coils 1162 and 1172. The position sensors 1191 and 1192 may include, for example, a magnetic sensor such as a Hall sensor or a magnetoresistive sensor.

In an embodiment, the folded module 1100 may include a sensing magnet 1163 separate from the OIS magnets 1161 and 1171. In an embodiment, the sensing magnet 1163 may be disposed on a top portion of the first OIS magnet 1161, and the position sensor 1191, which is disposed outside the first OIS coil 1162, may be disposed in a region where a magnetic field of the sensing magnet 1163 is applied.

A stopper 1400 may be disposed on one side of the folded module 1100, and the stopper 1400 may limit a rotation range of the folded module 1100. The stopper 1400 may include a buffer member 1410 configured to alleviate noise or impact occurring when abutting the folded module 1100. The buffer member 1400 may be made of, for example, urethane, rubber, silicone, or another material having elasticity.

Figure 3:
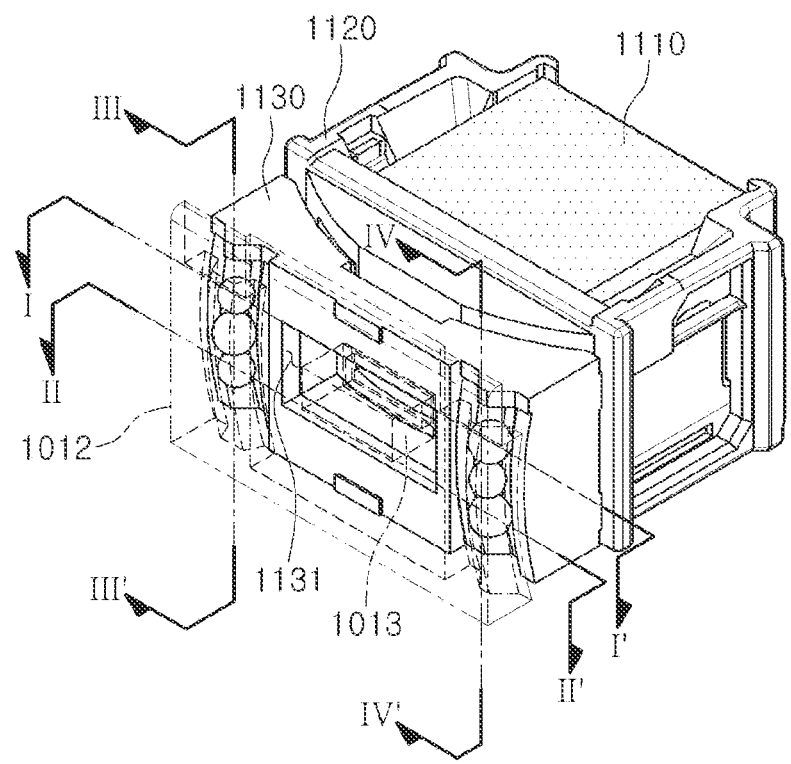
FIG. 3 shows a support structure of a folded module, in an embodiment.
Figure 4:
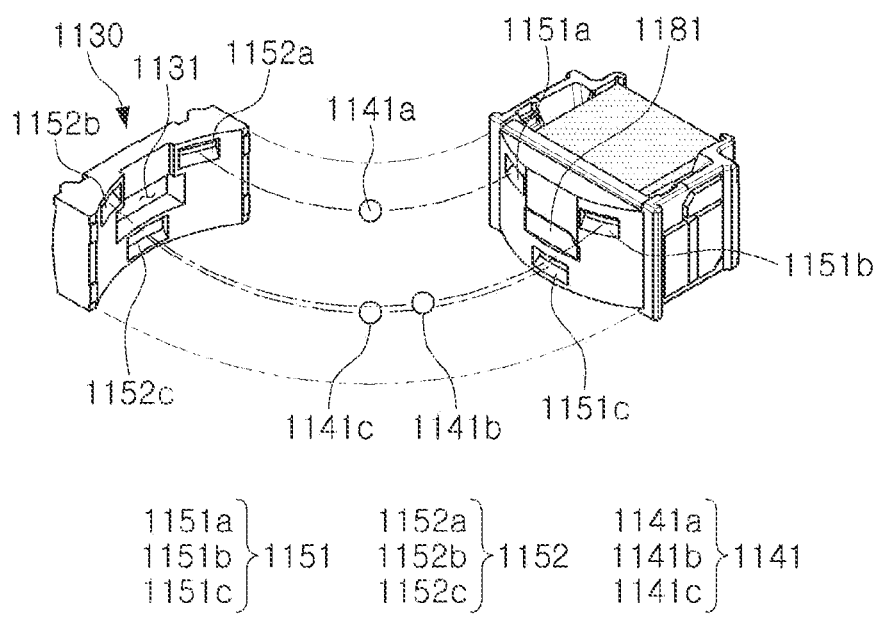
FIG. 4 shows a support structure between a rotation holder and a middle guide, in an embodiment.
Figure 5:
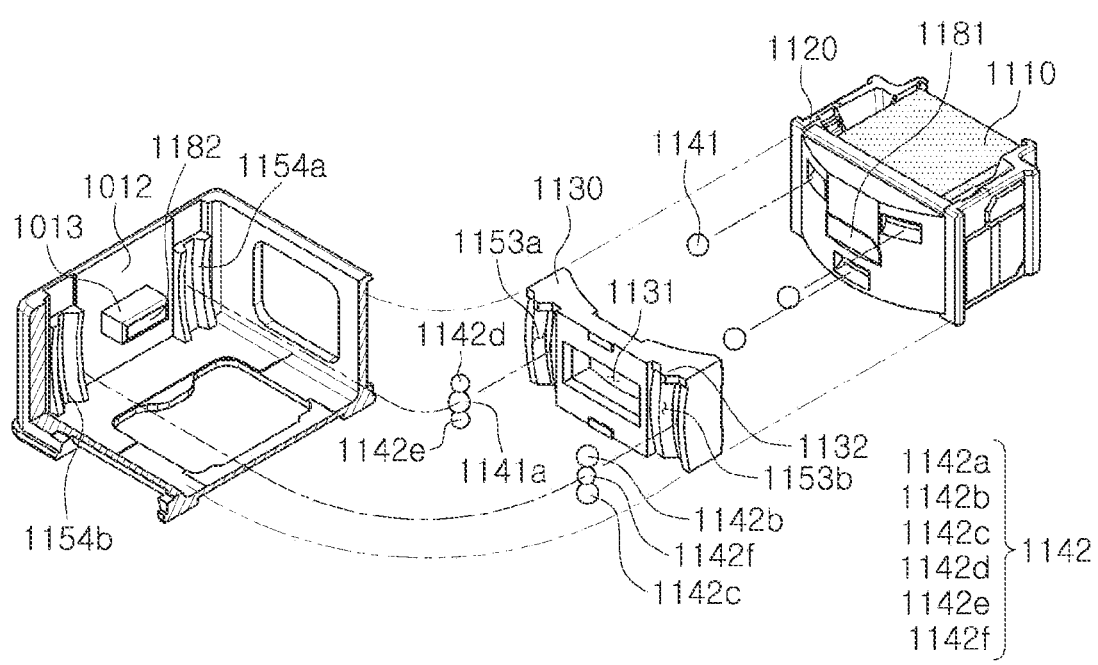
FIG. 5 shows a support structure between a first-type middle guide and a housing, in an embodiment.

FIG. 3 shows a support structure of the folded module 1100, in an embodiment. FIG. 4 shows a support structure between the rotation holder 1120 and the middle guide 1130, in an embodiment. FIG. 5 shows a support structure between the middle guide 1130 and the housing 1010, in an embodiment.

Referring to FIGS. 3 through 5, the middle guide 1130 may be interposed between the rotation holder 1120 and the housing 1010 to guide the rotation of the rotation holder 1120.

It may be assumed that the rotation holder 1120 is rotated about the first and second axes, perpendicular to the optical axis and intersecting each other, with respect to housing 1010. In this case, the middle guide 1130 may be rotated about the first axis with respect to the housing 1010, and may be rotated about the second axis with respect to the rotation holder 1120.

The following description describes how the rotation holder 1120 is rotated about the first axis with respect to the middle guide 1130, and how the middle guide 1130 is rotated about the second axis with respect to the housing 1010.

Figure 6:
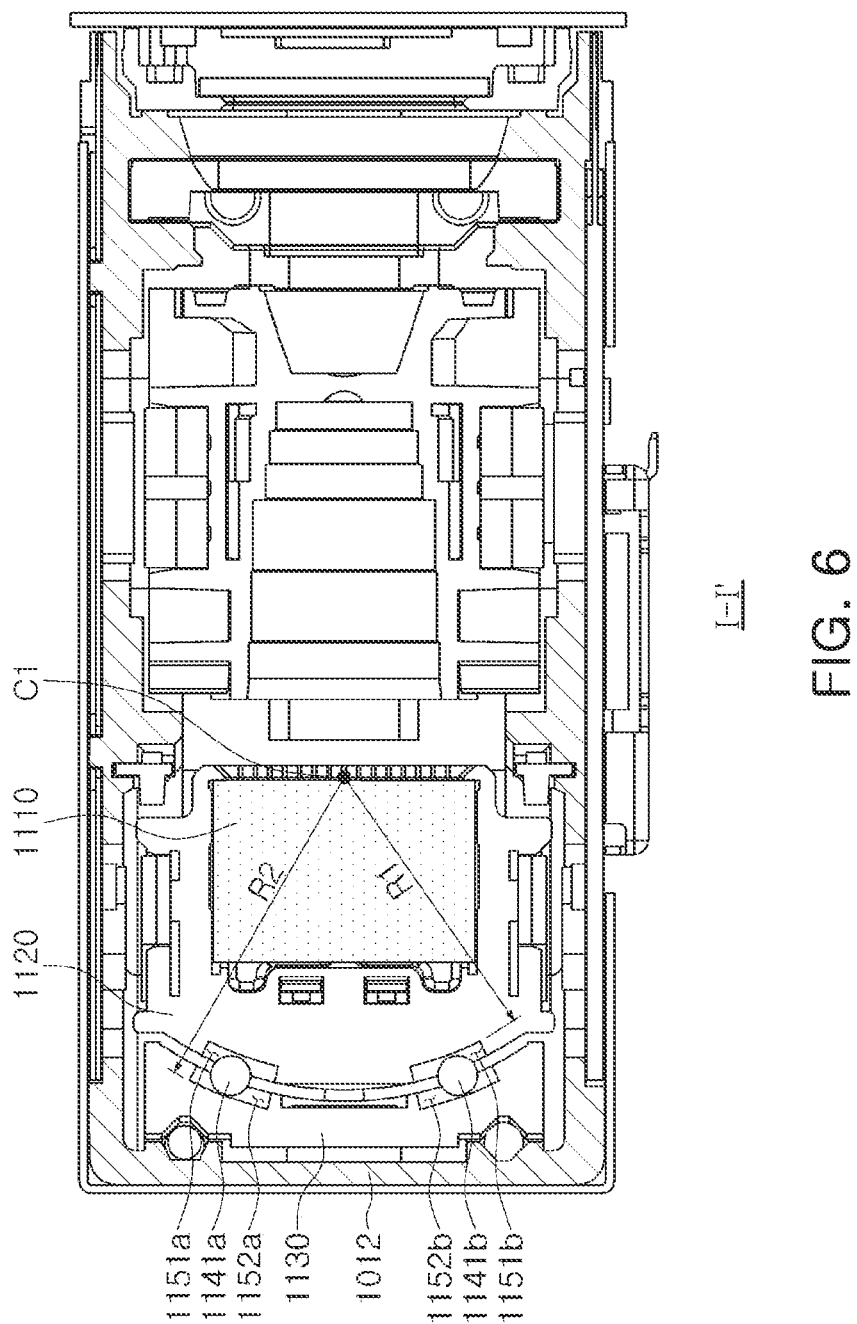
FIG. 6 is a cross-sectional view taken along line I-I' of FIG. 3.
Figure 7:
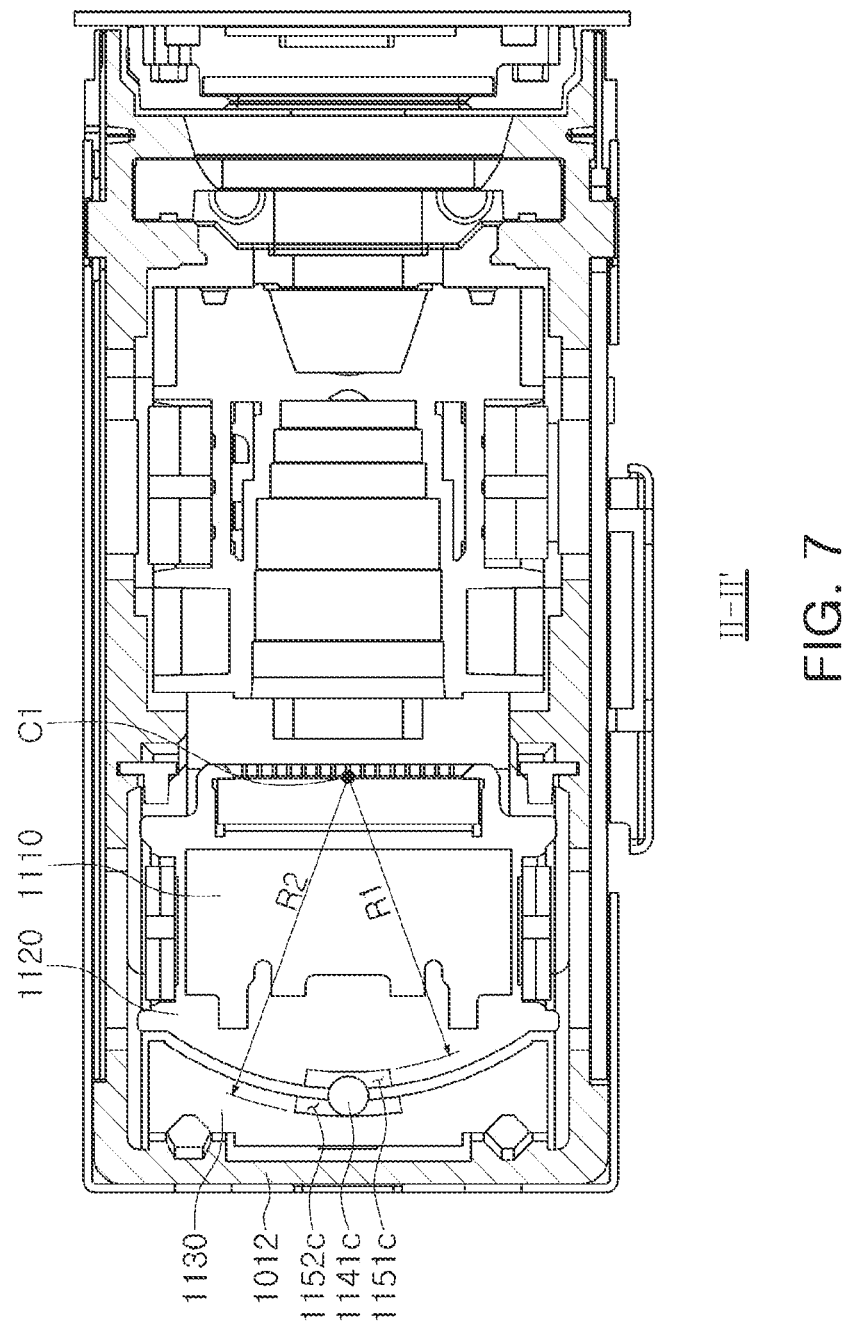
FIG. 7 is a cross-sectional view taken along line II-II' of FIG. 3.
Figure 8:
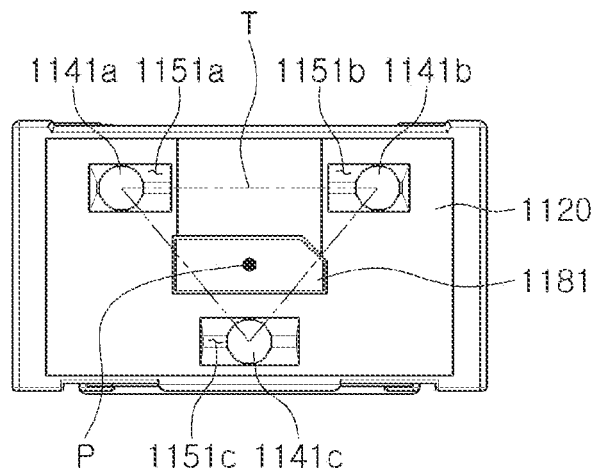
FIG. 8 shows the rotation holder and ball members disposed in the rotation holder, in an embodiment.
Figure 9:
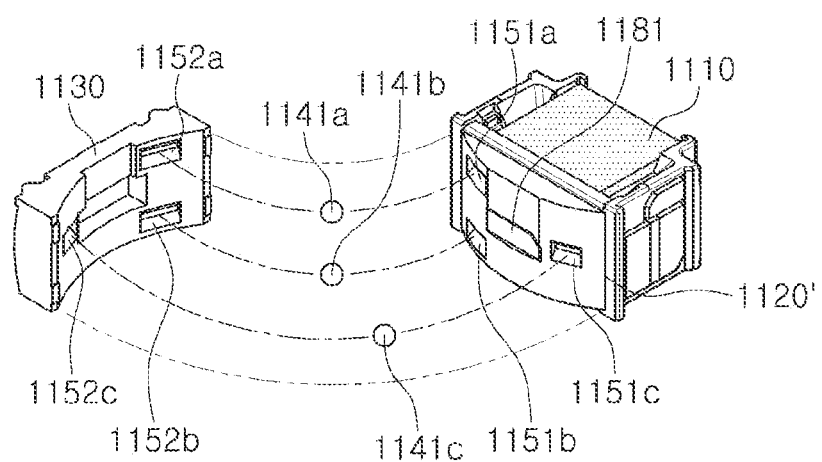
FIG. 9 shows a support structure between a second-type rotation holder and the middle guide, in an embodiment.
Figure 10:
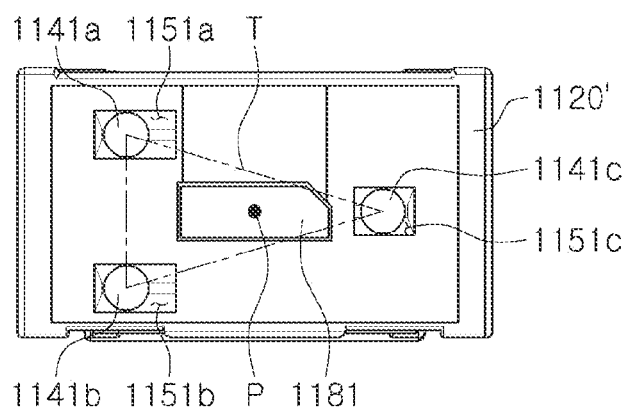
FIG. 10 shows the second-type rotation holder and the ball members disposed in the second-type rotation holder, in an embodiment.

FIG. 6 is a cross-sectional view taken along line I-I' of FIG. 3. FIG. 7 is a cross-sectional view taken along line II-II' of FIG. 3. FIG. 8 shows the rotation holder 1120 and ball members disposed in the rotation holder 1120, in an embodiment. FIG. 9 shows a support structure between a second-type rotation holder 1120' and the middle guide 1130, in an embodiment. FIG. 10 shows the second-type rotation holder 1120' and the ball members disposed in the second-type rotation holder 1120', in an embodiment.

Referring to FIGS. 3 to 5, in an embodiment, the folded module 1100 may include a first ball group 1141, configured to guide a tilt movement of the rotation holder 1120 relative to a first axis C1, and guide grooves 1151 and 1152 partially accommodating the first ball group 1141.

The first ball group 1141 may be disposed between the rotation holder 1120 and the middle guide 1130, and the first ball group 1141 may be moved along the first guide groove 1151 and the second guide groove 1152, which are respectively positioned in the rotation holder 1120 and the middle guide 1130.

Referring to FIGS. 3 to 6, when ball members 1141*a* 1141*b* and 1141*c* of the first ball group 1141 are moved along the guide grooves 1151 and 1152, which are respectively positioned in the rotation holder 1120 and the middle guide 1130, a path through centers of the ball members 1141*a*, 1141*b* and 1141*c* may have a shape of an arc having the first axis C1 as its center. In an embodiment, the guide grooves 1151 and 1152 may each include a curved guide groove. In an embodiment, the guide grooves 1151 and 1152 may be extended in a circumferential direction of the first axis C1. Referring to FIGS. 6 and 7, the first guide groove 1151 and the second guide groove 1152 may be extended in the arc shape based on the first axis C1. Curvature centers of the first and second guide grooves 1151 and 1152 may be positioned on the first axis C1.

In an embodiment, the first ball group 1141 may include the three ball members 1141a, 1141b and 1141c, and the three first guide grooves 1151 and the three second guide grooves 1152 may thus be positioned to guide the three ball members 1141a, 1141b and 1141c separately from one another. In an embodiment, the first guide groove 1151 may include three guide grooves 1151a, 1151b and 1151c, distinguished from one another, and the three ball members 1141a, 1141b and 1141c may respectively be accommodated in the three guide grooves 1151a, 1151b and 1151c.

In an embodiment, the three guide grooves 1151a, 1151b and 1151c included in the first guide groove 1151 may each have a shape of an arc having the same radius R1 with respect to the first axis C1. In an embodiment, three guide grooves 1152a, 1151b and 1151c included in the second guide groove 1152 may each have a shape of an arc having the same radius R2 with respect to the first axis C1. Here, the radius of the guide groove may be a distance between the first axis C1 and a surface of the guide groove when the guide groove is cut in a plane perpendicular to the first axis C1 and passing through a center of the ball member accommodated in the guide groove.

The rotation holder 1120 may be rotated about the first axis C1 according to a moment about the Y axis acting on the rotation holder 1120 from the first axis by the first OIS driver of the guide groove.

In an embodiment, the first guide groove 1151 and the second guide groove 1152 may have one or two contact points with each of the ball members 1141a, 1141b and 1141c. For example, the first guide groove 1151 may have a V shape and may come into contact with the ball member at two points. For example, the guide grooves 1152a and 1152b of the second guide groove 1152, which are positioned above a through portion 1131 of the middle guide 1130, may have two contact points with the ball members 1141a and 1141b, respectively, and the other guide groove 1152c of the second guide groove 1152 may have a rectangular cross section and may come into contact with the ball member 1141c at one point.

In an embodiment, the camera module 1000 may include the pulling member configured to provide a pulling force that pulls the rotation holder 1120 to a side wall 1012 of the housing 1010. In an embodiment, the pulling member may include a first magnetic member 1181 mounted in the rotation holder 1120 and a second magnetic member 1182 mounted in the housing 1010. A magnetic attraction between the two magnetic members 1181 and 1182 may function as the pulling force. For example, the first magnetic member 1181 may be a magnet and the second magnetic member 1182 may be a magnet or a yoke. For another example, the first magnetic member 1181 may be the yoke and the second magnetic member 1182 may be the magnet.

The middle guide 1130 may be interposed between the rotation holder 1120 and the housing 1010, and the pulling force may be weakened when the middle guide 1130 is positioned between the first magnetic member 1181 and the second magnetic member 1182. Therefore, in an embodiment, the middle guide 1130 may include a through portion 1131 through which the first magnetic member 1181 and the second magnetic member 1182 face each other. The second magnetic member 1182 may be mounted on a protrusion 1013 extended from the side wall 1012 of the housing 1010 toward the first magnetic member 1181. The protrusion 1013 may be partially inserted into the through portion 1131 of the middle guide 1130. Accordingly, the first magnetic member 1181 and the second magnetic member 1182 may be positioned relatively close to each other, which may prevent the pulling force from being decreased due to the middle guide 1130.

In another embodiment, the pulling member may include a first pulling member configured to pull the rotation holder 1120 and the middle guide 1130 each other and a second pulling member configured to pull the housing 1010 and the middle guide 1130 each other. For example, the first pulling member may include a pair of magnetic members respectively mounted on the rotation holder 1120 and the middle guide 1130 and facing each other, and the second pulling member may include a pair of magnetic members respectively mounted on the middle guide 1130 and the housing 1010 and facing each other.

Referring to FIG. 8, the pulling force may be applied in an inner region (or inner area) of a triangle T connecting the centers of the three ball members 1141a, 1141b and 1141c to one another. In this disclosure, the pulling force (or center of the pulling force P) may be positioned in the triangle T. That is, a line on which a resultant force of the pulling force generated by the magnetic members 1181 and 1182 acts may pass through the inside of the triangle T. For example, when viewed in the Z-axis direction, a weight center of the first magnetic member 1181 may be positioned in the triangle T. For another example, the inner region of the triangle T and the first magnetic member 1181 may overlap each other in the direction (i.e., the Z direction) parallel to the optical axis direction. In an embodiment, even when the rotation holder 1120 is rotated with respect to the middle guide 1130, the pulling force may be positioned in the inner region of the triangle T. Accordingly, each of the three ball members 1141a, 1141b and 1141c may maintain close contact with the guide grooves 1151 and 1152 on both sides thereof while the OIS function is performed. This disposition may allow the rotation holder 1120 to perform only a rotational motion about the first axis C1 with respect to the middle guide 1130.

The illustrated embodiment shows that the first ball group 1141 includes the two ball members 1141a and 1141b disposed above the first magnetic member 1181 and the one ball member 1141c disposed below the first magnetic member 1181. However, the disclosure herein is not limited to the illustrated configuration. That is, it may be sufficient that the pulling force is positioned in the triangle T formed by the three ball members 1141a, 1141b and 1141c, and specific positions of the three ball members 1141a, 1141b and 1141c may be changed. Referring to FIGS. 9 and 10, in an embodiment including the second-type rotation holder 1120', the two ball members 1141a and 1141b may be disposed in the left side of the first magnetic member 1181, and the one ball member 1141c may be disposed in the right side of the first magnetic member 1181.

Figure 11:
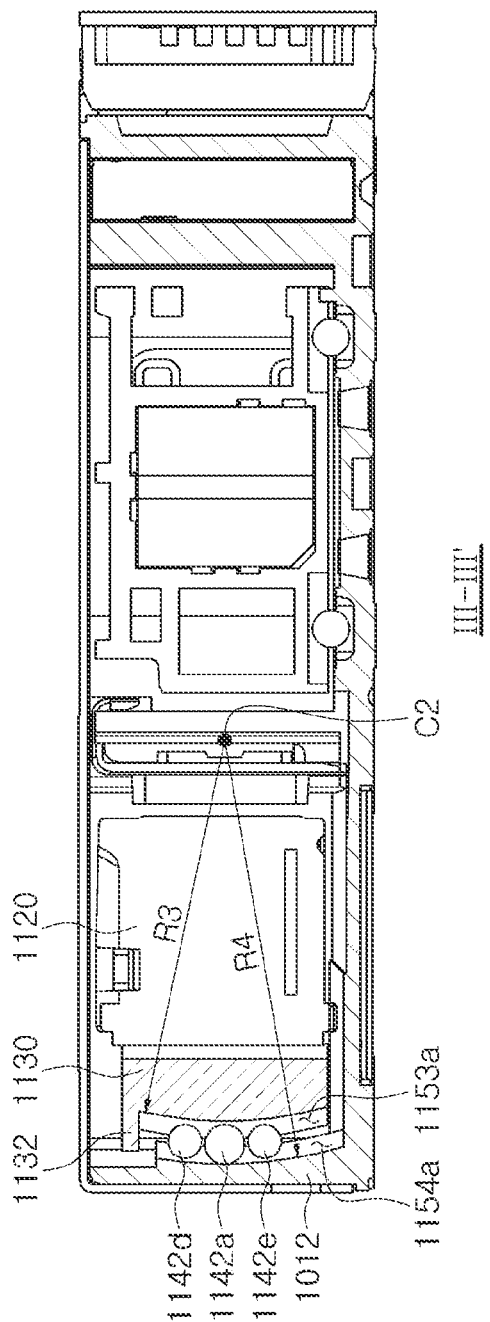
FIG. 11 is a cross-sectional view taken along line III-III' of FIG. 3, in an example including the first-type middle guide.
Figure 12:
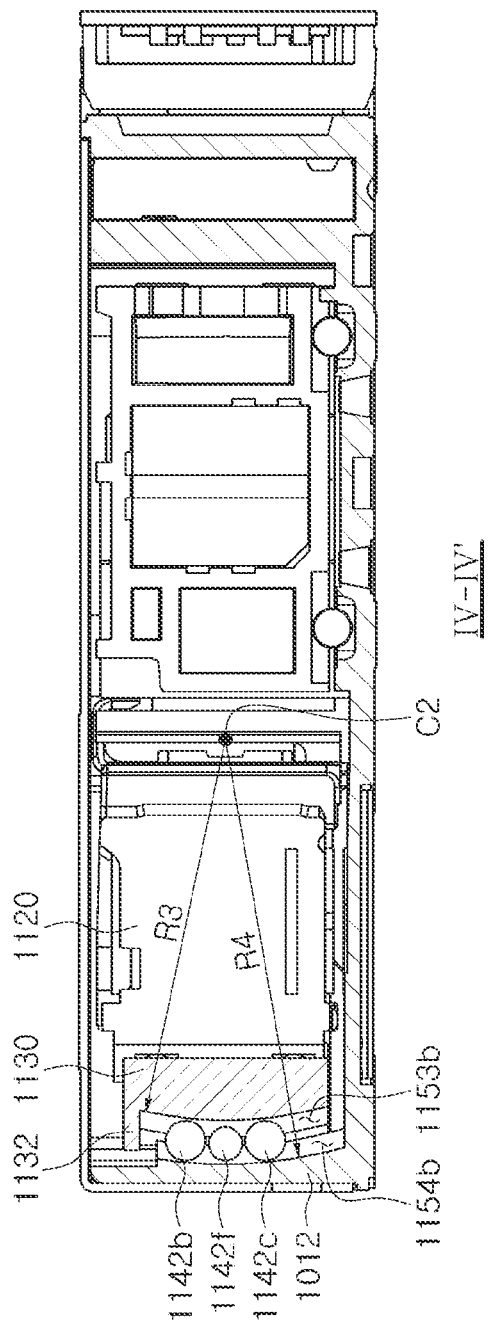
FIG. 12 is a cross-sectional view taken along line IV-IV' of FIG. 3, in an example including the first-type middle guide.
Figure 13:
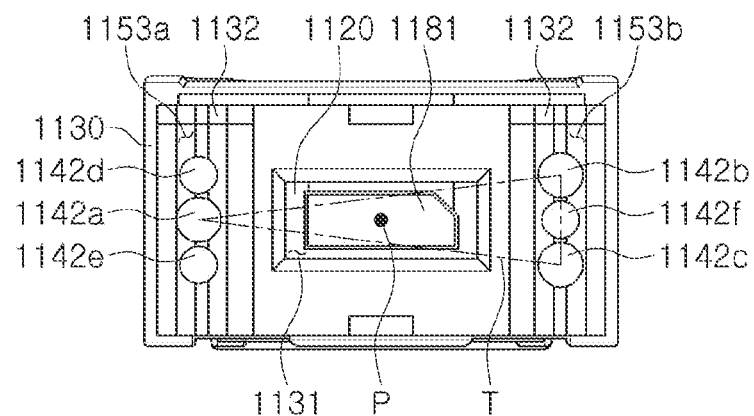
FIG. 13 shows the first-type middle guide and the ball members disposed in the middle guide, in an embodiment.

FIG. 11 is a cross-sectional view taken along line III-III' of FIG. 3, in an example including the middle guide 1130 (which may be referred to as a first-type middle guide 1130). FIG. 12 is a cross-sectional view taken along line IV-IV' of FIG. 3, in an example including the first-type middle guide 1130. FIG. 13 shows the first-type middle guide 1130 and the ball members disposed in the first-type middle guide 1130 in an embodiment.

Referring to FIGS. 11 and 12, the folded module 1100 may include a second ball group 1142 configured to guide a tilt movement of the rotation holder 1120 relative to a second axis C2, and guide grooves 1153 and 1154 partially accommodating the second ball group 1142, respectively.

The second ball group 1142 may be disposed between the middle guide 1130 and the housing 1010, and the second ball group 1142 may be moved along the third guide groove 1153 and the fourth guide groove 1154 respectively positioned in the middle guide 1130 and the housing 1010.

When the ball members 1142*a*, 1142*b*, 1142*c*, 1142*d*, 1142*e* and 1142*f* included in the second ball group 1142 may be moved along the guide grooves 1153 and 1154 respectively positioned in the housing 1010 and the middle guide 1130, a path through which centers of the ball members 1142*a*, 1142*b*, 1142*c*, 1142*d*, 1142*e* and 1142*f* pass may have a shape of an arc having the second axis C2 as its center. In an embodiment, the guide grooves 1153 and 1154 may each include a curved guide groove. In an embodiment, the guide grooves 1153 and 1154 may be extended in a circumferential direction of the second axis C2. Referring to FIGS. 11 and 12, the third guide groove 1153 and the fourth guide groove 1154 may be extended in the arc shape based on the second axis C2. Curvature centers of the third and fourth guide grooves 1153 and 1154 may be positioned on the second axis C2.

In an embodiment, the third guide groove 1153 may be positioned in the middle guide 1130, and may include two guide grooves 1153*a* and 1153*b* spaced apart from each other. The two ball members 1142*b* and 1142*c* of the second ball group 1142 may be accommodated in the guide groove 1153*b* positioned on one side of the middle guide 1130, and the other ball member 1142*a* may be accommodated in the guide groove 1153*a* positioned on the other side of the middle guide 1130.

In an embodiment, the second ball group 1142 may include the six ball members 1142*a*, 1142*b*, 1142*c*, 1142*d*, 1142*e* and 1142*f*, and three ball members among the six ball members 1142*a*, 1142*b*, 1142*c*, 1142*d*, 1142*e* and 1142*f* may be positioned in each side of the middle guide 1130 based on the through portion 1131. The third guide groove 1153 may include the two guide grooves 1153*a* and 1153*b* positioned on both sides of the middle guide 1130 based on the through portion 1131, and each guide groove may guide three ball members among the six ball members 1142*a*, 1142*b*, 1142*c*, 1142*d*, 1142*e* and 1142*f*. For example, the one guide groove 1153*a* positioned on the one side may guide the three ball members 1142*a*, 1142*b* and 1142*c* positioned, and the guide groove 1153*b* positioned in the other side may guide the rest three ball members 1142*d*, 1142*e* and 1142*f*. The fourth guide groove 1154 may also include the two guide grooves 1154*a* and 1154*b*, positioned in both sides of the housing 1010 based on the second magnetic member 1182, and each guide groove may guide three ball members among the six ball members 1142*a*, 1142*b*, 1142*c*, 1142*d*, 1142*e* and 1142*f*.

The two guide grooves 1153*a* and 1153*b* included in the third guide groove 1153 may have a shape of an arc having the same radius R3 with respect to the second axis C2. The two guide grooves 1154*a* and 1153*b* included in the fourth guide groove 1154 may have a shape of an arc having the same radius R4 with respect to the second axis C2. Here, a radius of the guide groove may be a distance between the second axis C2 and a surface of the guide groove when the guide groove is cut in a plane perpendicular to the second axis C2 and passing through the center of the ball member accommodated in the guide groove. The rotation holder 1120 may be rotated about the second axis C2 according to a moment about the X axis acting on the rotation holder 1120 by the second OIS driver.

In an embodiment, the middle guide 1130 may be pulled to the side wall 1012 of the housing 1010 by the first magnetic member 1181 mounted on the rotation holder 1120 and the second magnetic member 1182 mounted on the housing 1010. That is, the pulling member may not directly pull the middle guide 1130 to the housing 1010, and may pull the rotation holder 1120 to the side wall 1012 of the housing 1010, thereby also allowing the middle guide 1130 to be also pulled to the side wall 1012 of the housing 1010.

In an embodiment, the three ball members 1142*a*, 1142*b* and 1142*c* of the six ball members 1142*a*, 1142*b*, 1142*c*, 1142*d*, 1142*e* and 1142*f*, disposed between the middle guide 1130 and the housing 1010, may support the middle guide 1130. For example, one ball member 1142*a* of the three ball members 1142*a*, 1142*d* and 1142*e*, positioned on one side of the middle guide 1130, and two ball members 1142*b* and 1142*c* of the three ball members 1142*b*, 1142*c* and 1142*f*, positioned on the other side of the middle guide 1130 may support the middle guide 1130 pulled to the side wall 1012 of the housing 1010 by the pulling force. In this disclosure, the ball member 1142*a*, 1142*b* or 1142*c* supporting the middle guide 1130 may be referred to as a support ball member, and the ball member 1142*d*, 1142*e* or 1142*f* that does not support the middle guide 1130 may be referred to as an auxiliary ball member.

In an embodiment, the auxiliary ball member 1142*d*, 1142*e* or 1142*f* may have a smaller diameter than the support ball member 1142*a*, 1142*b* or 1142*c*. The auxiliary ball member 1142*d*, 1142*e* or 1142*f* may function to limit the position of the support ball member 1142*a*, 1142*b* or 1142*c*. For example, the outer two auxiliary ball members 1142*d* and 1142*e* of the three ball members 1142*a*, 1142*d* and 1142*e* on the one side of the middle guide 1130 may allow the central support ball member 1142*a* to be positioned in a center of the third guide groove 1153. In addition, the central auxiliary ball member 1142*f* of the three ball members 1142*b*, 1142*c* and 1142*f* on the other side of the middle guide 1130 may allow a distance between the two support ball members 1142*b* and 1142*c*, positioned on both sides of the auxiliary ball member 1142*f*, to be maintained at a certain distance or more.

FIGS. 11 to 13 show the three auxiliary ball members 1142*d*, 1142*e* and 1142*f*, which is only an example. The auxiliary ball member 1142*d*, 1142*e* or 1142*f* may function to limit the position of the support ball member 1142*a*, 1142*b* or 1142*c*, and when a length of the third guide groove 1153 is short enough, some of the auxiliary ball members 1142*d*, 1142*e* and 1142*f* may be omitted. For example, some or all of the two auxiliary ball members 1142*d* and 1142*e*, on the left side of the middle guide 1130 in FIG. 13, may be omitted. In addition, FIGS. 11 to 13 show that the auxiliary ball member 1142*d* and 1142*e* are disposed on both sides of the support ball member, or one auxiliary ball member 1142*f* is disposed between the support ball members 1142*b* and 1142*c*, which is only an example. For example, two or more auxiliary ball members may be disposed on one side of the support ball member 1142*a*, 1142*b* or 1142*c*. For another example, two or more auxiliary ball members may be disposed between the support ball members 1142*b* and 1142*c*.

Referring to FIG. 13, in an embodiment, the pulling force may be positioned (e.g. centered) in the inner region (or inner area) of the triangle T connecting the centers of the three support ball members 1142*a*, 1142*b* and 1142*c*. For example, the inner region of the triangle T and the first magnetic member 1181 may overlap each other in the direction (i.e., the Z direction) parallel to the optical axis direction. In an embodiment, the pulling force may be positioned in the inner region of the triangle T even when the middle guide 1130 is rotated relative to the housing 1010.

Accordingly, each of the three ball members 1142a, 1141b and 1141c may maintain close contact with the guide grooves 1153 and 1154 on both sides thereof while the OIS function is performed. This disposition may prevent the middle guide 1130 from being moved in a direction other than its rotational direction with respect to the second axis C2.

In an embodiment, the third guide groove 1153 may include a protrusion 1132 at its end to prevent the second ball group 1142 from being separated from the third guide groove 1153.

In an embodiment, one of the fourth guide grooves 1154 (e.g., guide groove 1154a or 1154b) may be in contact with the ball member at one point. For example, the ball member 1142a of the support ball members, accommodated in the guide groove 1154a positioned in one side of the housing 1010, may be in contact with the guide groove 1154a at one point.

Figure 14:
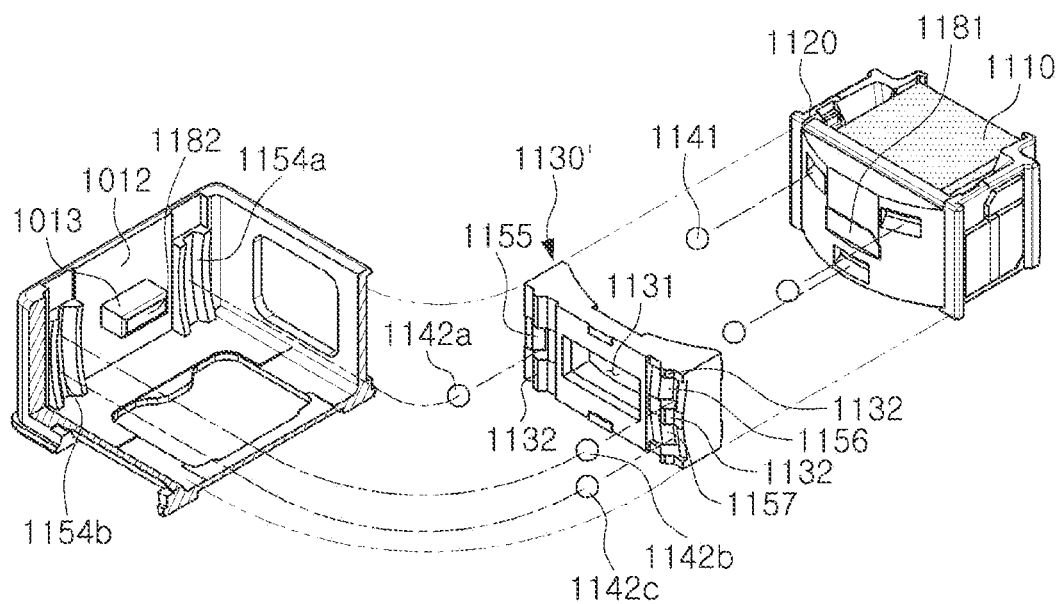
FIG. 14 shows a support structure between a second-type middle guide and the housing, in an embodiment.
Figure 15:
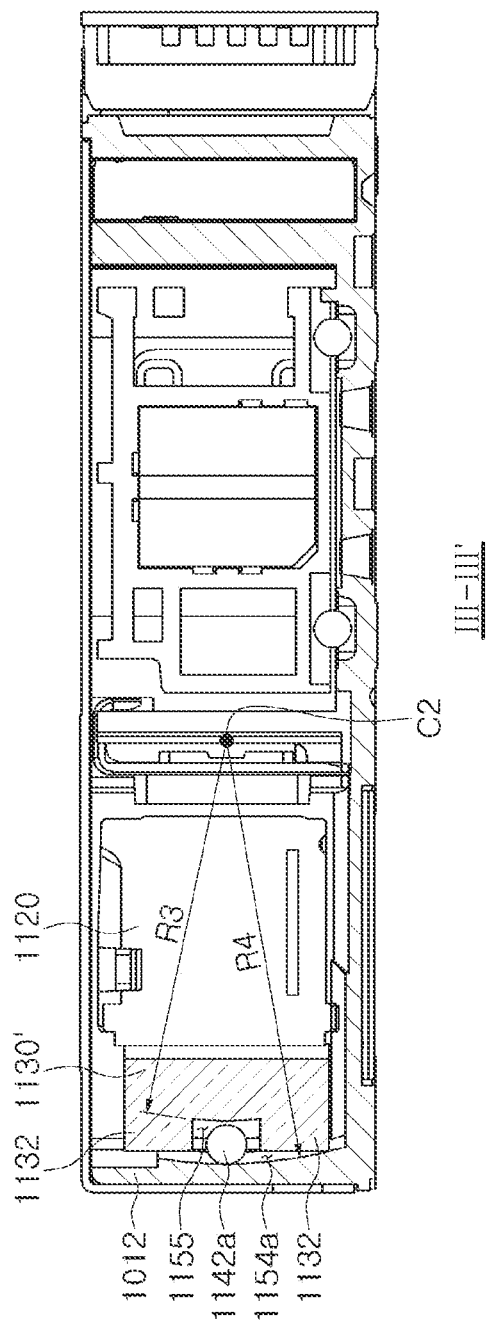
FIG. 15 is a cross-sectional view taken along line III-III' of FIG. 3, in an example including the second-type middle guide.
Figure 16:
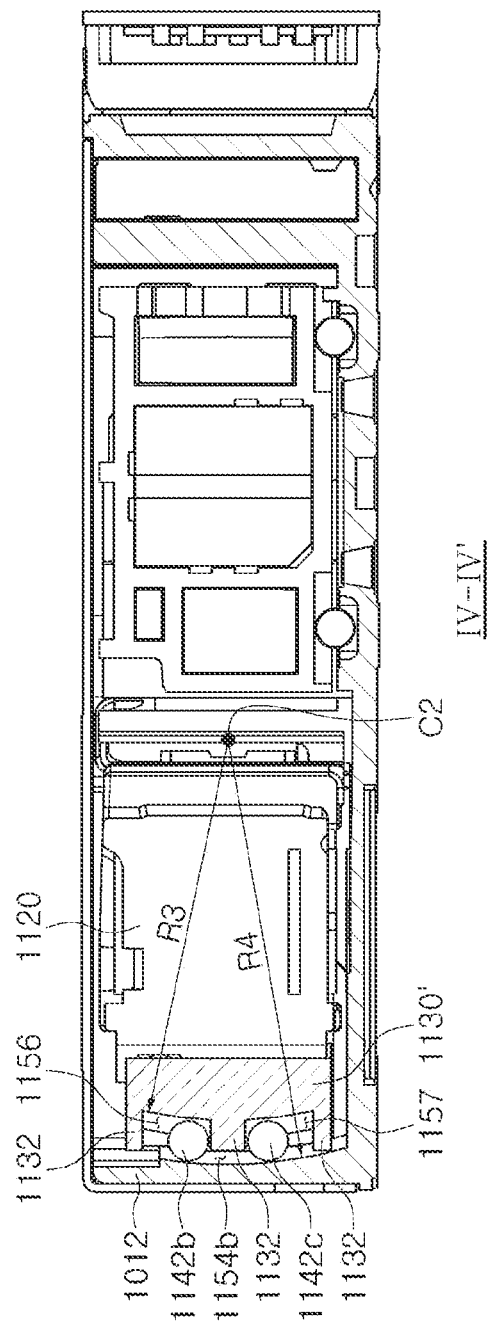
FIG. 16 is a cross-sectional view taken along line IV-IV' of FIG. 3, in an example including the second-type middle guide.

FIG. 14 shows a support structure between a second-type middle guide 1130' and the housing 1010, in an embodiment. FIG. 15 is a cross-sectional view taken along line III-III' of FIG. 3, in an example including the second-type middle guide 1130'. FIG. 16 is a cross-sectional view taken along line IV-IV' of FIG. 3, in an example including when the second-type middle guide 1130'.

In an embodiment, the second-type middle guide 1130' may include three guide grooves 1155, 1156 and 1157 distinguished from one another, and the three ball members 1142a, 1142b and 1142c included in the second ball group 1142 may be respectively accommodated in the guide grooves 1155, 1156 and 1157. In an embodiment, the first ball member 1142a may be disposed on one side of the second-type middle guide 1130', and the second ball member 1142b and the third ball member 1142c may be disposed on the other side of the second-type middle guide 1130'. The first ball member 1142a may be partially accommodated in the fifth guide groove 1155, and the second ball member 1142b and the third ball member 1142c may be partially accommodated in the sixth guide groove 1156 and the seventh guide groove 1157, respectively.

When the ball members are moved along the fourth through seventh guide grooves 1154, 1155, 1156 and 1157, which are positioned in the housing 1010 and the second-type middle guide 1130', respectively, a path through which the centers of the ball members 1142a, 1142b and 1142c pass may have a shape of an arc having the second axis C2 as its center. Referring to FIGS. 15 and 16, the fourth through seventh guide grooves 1154, 1155, 1156 and 1157 may be extended in the arc shape based on the second axis C2. Curvature centers of the fourth to seventh guide grooves 1154, 1155, 1156 and 1157 may be positioned on the second axis C2.

The fifth to seventh guide grooves 1155, 1156 and 1157 may each have the shape of an arc having the same radius R3 with respect to the second axis C2. The two guide grooves 1154a and 1154b included in the fourth guide groove 1154 may have the shape of an arc having the same radius R4 with respect to the second axis C2. The rotation holder 1120 may be rotated about the second axis C2 according to a moment in which the force about the X axis acts on the rotation holder 1120 by the second OIS driver.

The fifth to seventh guide grooves 1155, 1156 and 1157 may allow the center of the pulling force P to be positioned in the triangle formed by the ball members 1142a, 1142b and 1142c while the second-type middle guide 1130' is rotated with respect to the housing 1010.

In an embodiment, the guide grooves 1155, 1156 and 1157 positioned in the second-type middle guide 1130' may respectively limit each movement range of the ball members 1142a, 1142b and 1142c.

In an embodiment, the fifth guide groove 1155 may be disposed in a middle portion of the second-type middle guide 1130'. The protrusion 1132 may be positioned on each side of the fifth guide groove 1155 to limit the movement range of the first ball member 1142a. Accordingly, the center of the pulling force P may be positioned in the support region even when the first ball member 1142a performs a rolling motion along the fifth guide groove 1155 as the second-type middle guide 1130' is rotated with respect to the housing 1010.

In an embodiment, the protrusion 1132 may be disposed between the sixth guide groove 1156 and the seventh guide groove 1157. Accordingly, the distance between the second ball member 1142b and the third ball member 1142c may be maintained equal to or greater than a length of the protrusion 1132. That is, the protrusion 1132 may replace a function of the auxiliary ball member (e.g., auxiliary ball members 1142a, 1142c and 1142e in FIG. 5) in the first-type support structure (e.g., middle guide 1130 in FIG. 5). In an exemplary embodiment, the protrusions 1132 may be positioned at both ends of the sixth guide groove 1156 and the seventh guide groove 1157 to prevent the second ball member 1142b and the third ball member 1142c from being separated from the guide grooves, respectively.

An embodiment of this disclosure describes, with reference to the drawings, that the rotation holder 1120 is rotated about the first axis C1 with respect to the middle guide 1130, and the middle guide 1130 is rotated about the second axis C2 with respect to the side wall 1012 of the housing 1010. However, this configuration is only an example, and the relative rotation directions of the rotation holder 1120 and the middle guide 1130 may be changed. That is, in another embodiment, the rotation holder 1120 may be rotated about the second axis C2 with respect to the middle guide 1130, and the middle guide 1130 may be rotated about the first axis C1 with respect to the side wall 1012 of the housing 1010. For example, the first guide groove 1151 and the second guide groove 1152 may be extended in an arc shape based on the second axis C2, and the third guide groove 1153 and the fourth guide groove 1154 may be extended in an arc shape based on the first axis C1.

Referring to FIGS. 4 and 5, the first guide groove 1151 and the second guide groove 1152 may respectively be formed as three guide grooves to respectively accommodate the three ball members 1141a, 1141b and 1141c, which is only an example. In another embodiment, the first guide groove 1151 and the second guide groove 1152 may each have the same shape as the third guide groove 1153 positioned in the first-type middle guide 1130 or the fourth guide groove 1154 positioned in the side wall 1012. For example, the upper two ball members 1141a and 1141b of the first ball group 1141 may be accommodated in two separate guide grooves, respectively, and the two guide grooves may be replaced with one guide groove. In this case, an auxiliary ball member may be additionally disposed between the two ball members 1141a and 1141b accommodated in one guide groove. The auxiliary ball member may maintain a distance between the two ball members.

In an example in which four ball members are interposed between the middle guide 1130 and the rotation holder 1120, unexpected shake may occur if the rotation holder 1120 is rotated with respect to the middle guide 1130. that the shake may occur because a change may occur in some of the ball members disposed between the rotation holder 1120 and the middle guide 1130 and supporting the rotation holder 1120 while the rotation holder 1120 is rotated. One plane is sufficiently defined by three points even when the four ball members support the rotation holder 1120, and it is difficult for the four ball members to support the rotation holder 1120 while being in perfectly close contact with the rotation holder 1120 due to the manufacturing tolerance of the housing 1010, middle guide 1130 or rotation holder 1120. That is, only three ball members out of the four ball members may actually support the rotation holder 1120, and the other ball member may not support the rotation holder 1120 (i.e., may not provide a reaction force to the pulling force). In addition, the configuration of the three ball members supporting the rotation holder 1120 may be changed while the rotation holder 1120 is rotated with respect to the middle guide 1130. For example, it may be assumed that two ball members are disposed in a first side of the rotation holder 1120 and two ball members are disposed in a second side of the rotation holder 1120. In this case, one of the two ball members on the other side may support the pulling force when the pulling force is close to one side of the rotation holder 1120, and both the two ball members on the other side may support the pulling force when the pulling force is close to the other side of the rotation holder 1120. Due to the change in the support ball members, the rotation holder 1120 may vibrate in a direction other than its designed movement direction while being rotated with respect to the middle guide 1130. The same problem as described above may occur when four ball members are disposed between the middle guide 1130 and the housing 1010 and supporting the middle guide 1130.

According to an embodiment of the present disclosure, only the three specific ball members 1141a, 1141b and 1141c disposed between the rotation holder 1120 and the middle guide 1130 or 1130' may support the rotation holder 1120. That is, the three specific ball members 1141a, 1141b and 1141c may continuously support the rotation holder 1120 regardless of the position of the rotation holder 1120 with respect to the middle guide 1130 or 1130'.

In addition, in an embodiment, only three specific ball members 1142a, 1142b and 1142c disposed between the middle guide 1130 or 1130' and housing 1010 may support the middle guide 1130 or 1130'. That is, the three specific ball members 1142a, 1142b and 1142c may continuously support the middle guide 1130 or 1130' regardless of the position of the middle guide 1130 or 1130' with respect to the housing 1010. Accordingly, the OIS function may be more smoothly performed.

In the disclosure herein, the three-point support may indicate that three ball members support the rotation holder 1120 (or the middle guide 1130 or 1130'), and may not necessarily indicate that the three points support the rotation holder 1120. When the ball member is actually in close contact with the guide groove on one side of the middle guide 1130 or 1130' or the housing 1010, one or two contact points (or contact surfaces) may be generated between the ball member and the guide groove.

Figure 17:
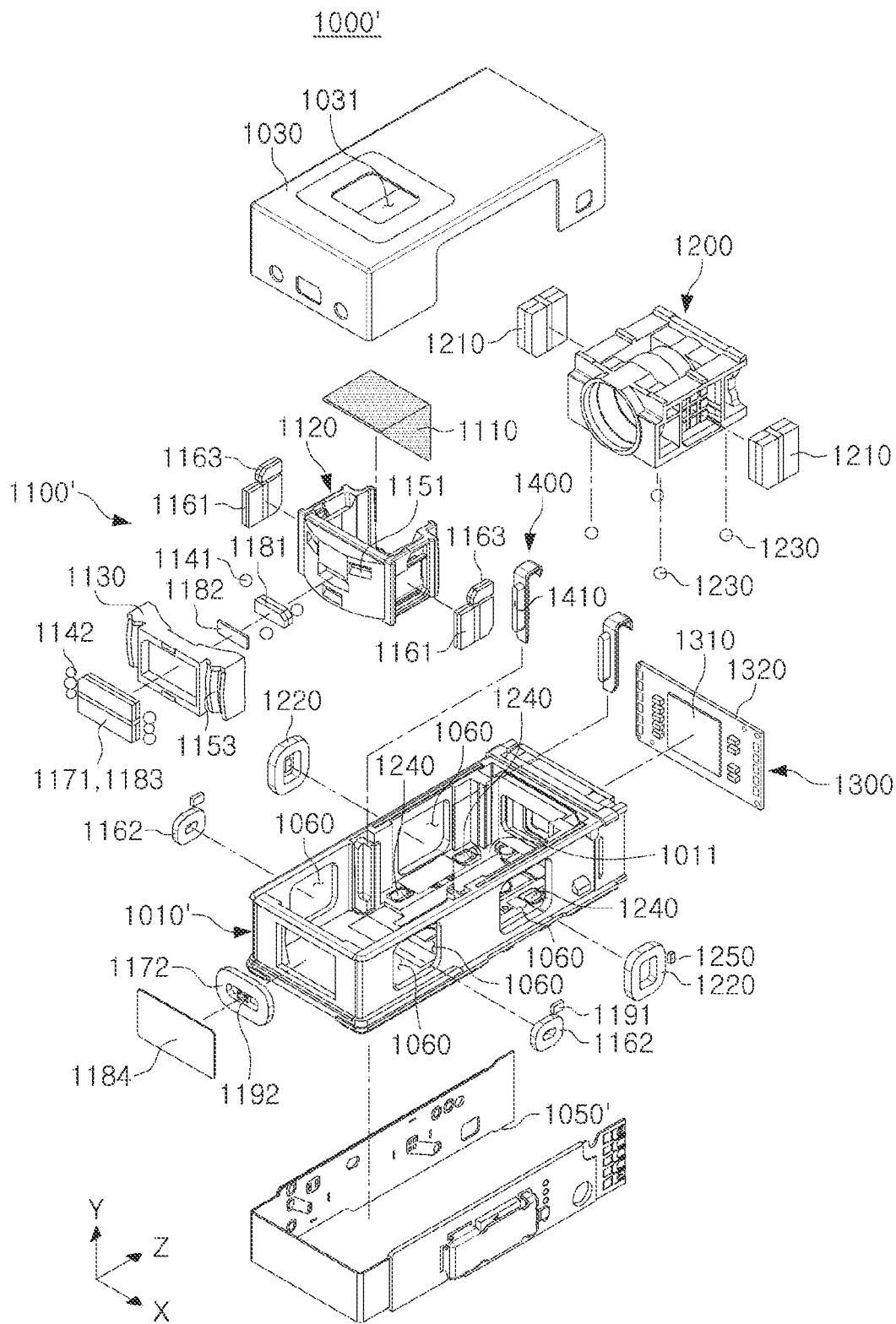
FIG. 17 is an exploded perspective view of a camera module, according to an embodiment.
Figure 18:
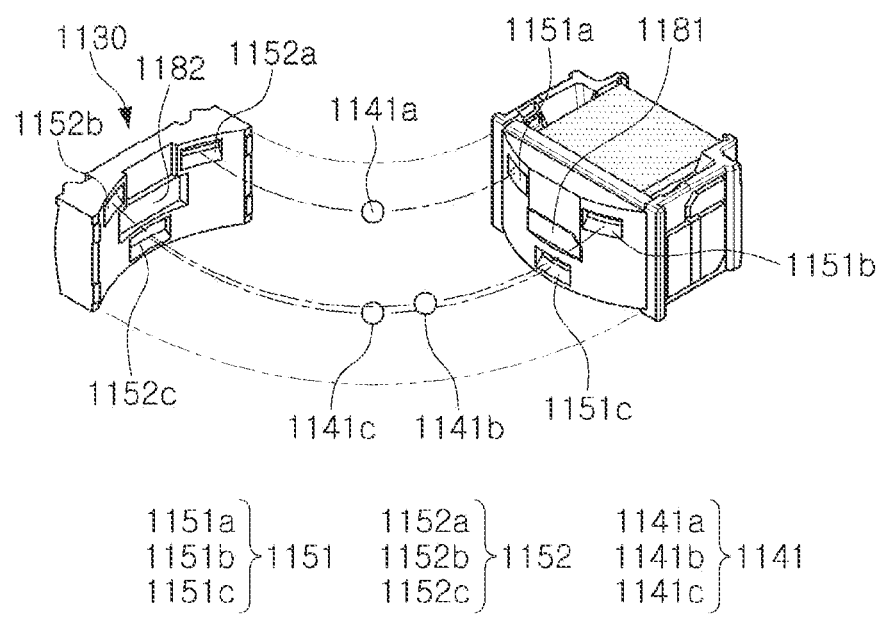
FIG. 18 shows a support structure between a rotation holder and a middle guide, in an embodiment.
Figure 19:
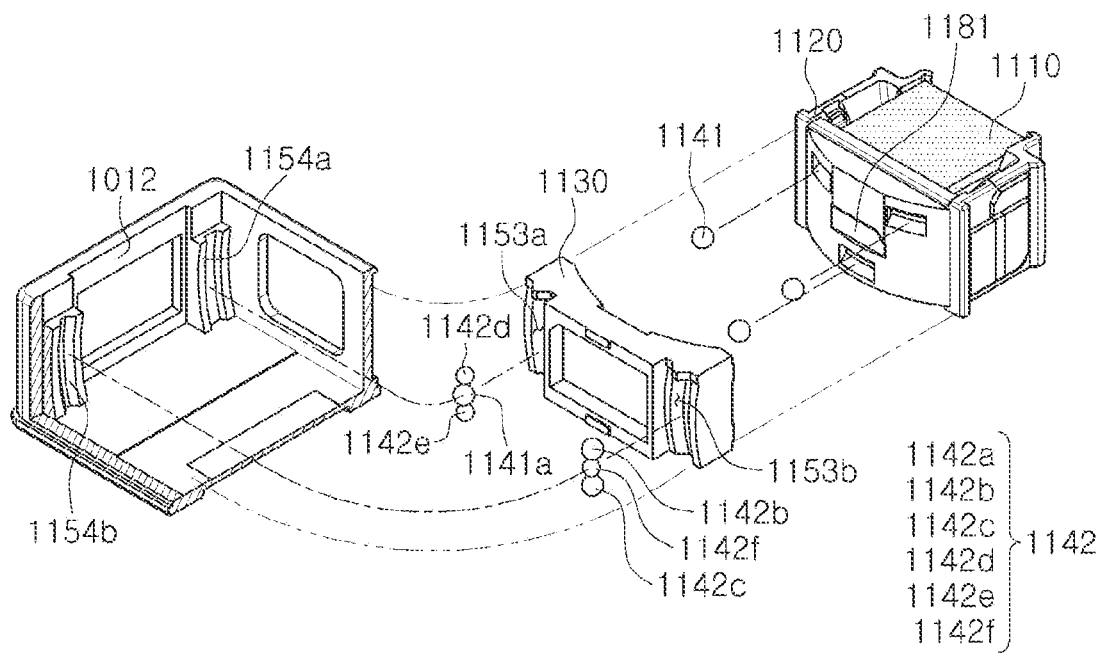
FIG. 19 shows a support structure between the first-type middle guide and the housing, in an embodiment.
Figure 20:
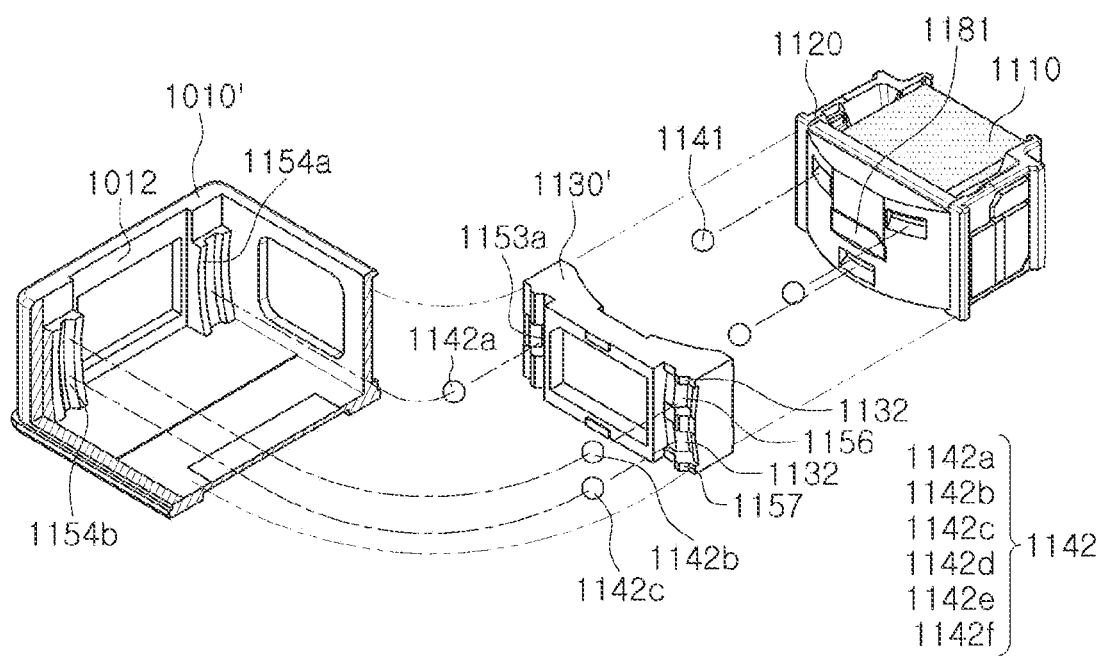
FIG. 20 shows a support structure between the second-type middle guide and the housing, in an embodiment.

FIG. 17 is a perspective view of a camera module 1000', according to an embodiment. FIG. 18 shows a support structure between the rotation holder 1120 and the first-type middle guide 1130, in an embodiment. FIG. 19 shows a support structure between the first-type middle guide 1130 and a housing 1010', in an embodiment. FIG. 20 shows a support structure between the second-type middle guide 1130' and the housing 1010', in an embodiment.

The embodiments described with reference to FIGS. 17 through 22 are the same as those described with reference to FIGS. 2 through 16, except for the OIS driver, the housing 1010', and a substrate 1050', and the description below thus omits redundant descriptions thereof.

In an embodiment, a folded module 1100' may include an OIS driver rotating the reflective member 1110 about the axis perpendicular to the optical axis with respect to the housing 1010'. In an embodiment, the OIS driver may include a first OIS driver configured to rotate the reflective member 1110 about the first axis C1 perpendicular to the optical axis, and a second OIS driver configured to rotate the reflective member 1110 about the second axis C2 perpendicular to the optical axis and intersecting the first axis C1. For example, the optical axis may be parallel to the Z axis, the first axis C1 may be parallel to the Y axis, and the second axis C2 may be parallel to the X axis.

In an embodiment, the first OIS driver may be disposed in each side of the rotation holder 1120. In an exemplary embodiment, the first OIS driver may include the first OIS magnet 1161 mounted on each sides of the rotation holder 1120, and the first OIS coil 1162 disposed facing the first OIS magnet 1161. The first OIS coil 1162 may be fixedly coupled to the housing 1010', and the rotation holder 1120 may be rotated about the first axis C1 perpendicular to the optical axis with respect to the housing 1010' by the electromagnetic interaction between the first OIS coil 1162 and the first OIS magnet 1161.

In an embodiment, the second OIS driver may be disposed in one side of the middle guide 1130. In an embodiment, the second OIS driver may include the second OIS magnet 1171 mounted on a surface of the middle guide 1130, opposite to a surface of the middle guide 1130, facing the rotation holder 1120 and the second OIS coil 1172 disposed facing the second OIS magnet 1171. The second OIS coil 1172 may be fixedly coupled to the housing 1010', and the middle guide 1130 may be rotated about the second axis C2 perpendicular to the optical axis with respect to the housing 1010' by an electromagnetic interaction between the second OIS coil 1172 and the first OIS magnet 1161. The rotation holder 1120 may perform only the rotational motion about the first axis C1 with respect to the middle guide 1130, and the rotation holder 1120 may also be rotated about the second axis C2 as the middle guide 1130 is rotated about the second axis C2.

In an embodiment, the first OIS coil 1162 and the second OIS coil 1172 may be attached to the substrate 1050', and the substrate 1050' may be fixed to the housing 1010. In an embodiment, the housing 1010' may include the openings 1060 exposing the first OIS coil 1162 and the second OIS coil 1172 to the inside of the housing 1010'.

Hereinafter, the description is made with reference to FIGS. 17 through 19.

The first pulling member may be disposed between the rotation holder 1120 and the middle guide 1130. The first pulling member may include the first magnetic member 1181 mounted on the rotation holder 1120 and the second magnetic member 1182 mounted on the middle guide 1130. The first magnetic member 1181 and the second magnetic member 1182 may generate a magnetic attraction to each other. For example, the first magnetic member 1181 may be a magnet and the second magnetic member 1182 may be a magnet or yoke. For another example, the first magnetic member 1181 may be the yoke and the second magnetic member 1182 may be the magnet.

The second pulling member may be disposed between the middle guide 1130 and the housing 1010'. The second pulling member may include a third magnetic member 1183 mounted on the middle guide 1130, and a fourth magnetic member 1184 mounted on the housing 1010. The third magnetic member 1183 and the fourth magnetic member 1184 may generate a magnetic attraction to each other. For example, the third magnetic member 1183 may be a magnet and the fourth magnetic member 1184 may be a magnet or yoke.

The fourth magnetic member 1184 may be attached to the substrate 1050' disposed on the side surface of the housing 1010'. The substrate 1050' may be coupled to the housing 1010' for the fourth magnetic member 1184 to be fixedly mounted on the housing 1010'.

A back-yoke may be additionally disposed between the first magnetic member 1181 and the rotation holder 1120 and/or between the middle guide 1130 and the third magnetic member 1183. For example, the back-yoke may be attached to the rotation holder 1120 or the middle guide 1130, and the first magnetic member 1181 or the third magnetic member 1183 may be attached to the back-yoke. The back-yoke may prevent leakage of a magnetic flux from the first magnetic member 1181 or third magnetic member 1183, thereby relatively increasing a magnetic attraction between the first magnetic member 1181 or third magnetic member 1183 and the second magnetic member 1182 or the fourth magnetic member 1184.

The third magnetic member 1183 and the second OIS magnet 1171 are referenced by different numbers but are the same component. That is, the third magnetic member 1183 may provide the pulling force together with the fourth magnetic member 1184 as the magnet, while interacting with the second OIS coil 1172 to provide a drive force to the middle guide 1130 (or rotation holder 1120).

In an embodiment, the position sensor 1192 configured to measure a rotational displacement of the rotation holder 1120 may be disposed inside or outside the second OIS coil 1172. The position of the position sensor 1192 relative to the third magnetic member 1183 may be changed as the middle guide 1130 (or rotation holder 1120) is rotated, and the rotational displacement of the middle guide 1130 may be measured based on this position change. The position sensor 1192 may include, for example, the magnetic sensor such as a Hall sensor or a magnetoresistive sensor.

Referring to FIG. 19, in an embodiment, the second ball group 1142 disposed between the housing 1010' and the first-type middle guide 1130 may include three ball members 1142*a*, 1142*d* and 1142*e*, disposed on one side of the middle guide 1130, and three ball members 1142*b*, 1142*c* and 1142*f*, disposed on the other side of the middle guide 1130. The ball members 1142*a*, 1142*d* and 1142*e* disposed on the one side may be partially accommodated in the third guide groove 1153, and the ball members 1142*b*, 1142*c* and 1142*f* disposed on the other side of the first-type middle guide 1130 may be partially accommodated in the fourth guide groove 1154.

The three support ball members 1142*a*, 1142*b* and 1142*c* out of the six ball members 1142*a*, 1142*b*, 1142*c*, 1142*d*, 1142*e* and 1142*f* may support the first-type middle guide 1130 (or rotation holder 1120). The remainder of the ball members 1142*d*, 1142*e* and 1142*f* out of the six ball members 1142*a*, 1142*b*, 1142*c*, 1142*d*, 1142*e* and 1142*f* may not directly support the first-type middle guide 1130, and may limit the position of the support ball members on the guide groove. For example, the first support ball member 1142*a* may be positioned in the central portion of the third guide groove 1153 due to the auxiliary ball members 1142*d* and 1142*e* being disposed on both sides of the first support ball member 1142*a*, and the second support ball member 1142*b* and the third support ball member 1142*c* may maintain a distance of a certain length or more from each other due to the auxiliary ball member 1142*f* being interposed therebetween.

Referring to FIG. 20, in an embodiment, the second ball group 1142 disposed between the housing 1010 and the second-type middle guide 1130' may include the one ball member 1142*a* disposed on one side of the second-type middle guide 1130' and the two ball members 1142*b* and 1142*c* disposed on the other side of the second-type middle guide 1130'. The ball member 1142*a* disposed on the one side of the second-type middle guide 1130' may be partially accommodated in the fifth guide groove 1155, and the two ball members 1142*b* and 1142*c* disposed on the other side of the second-type middle guide 1130' may be partially accommodated in the sixth guide groove 1156 and seventh guide groove 1157, respectively. The protrusions 1132 may respectively be disposed on both sides of the fifth guide groove 1155, and between the sixth guide groove 1156 and the seventh guide groove 1157. In the embodiment of FIG. 20, unlike the support structure of FIG. 19, the position of the support ball member 1142*a*, 1142*b* or 1142*c* may be limited by the position or shape of the guide groove, and the auxiliary ball member 1142*d*, 1142*e* or 1142*f* may not be necessary.

Figure 21:
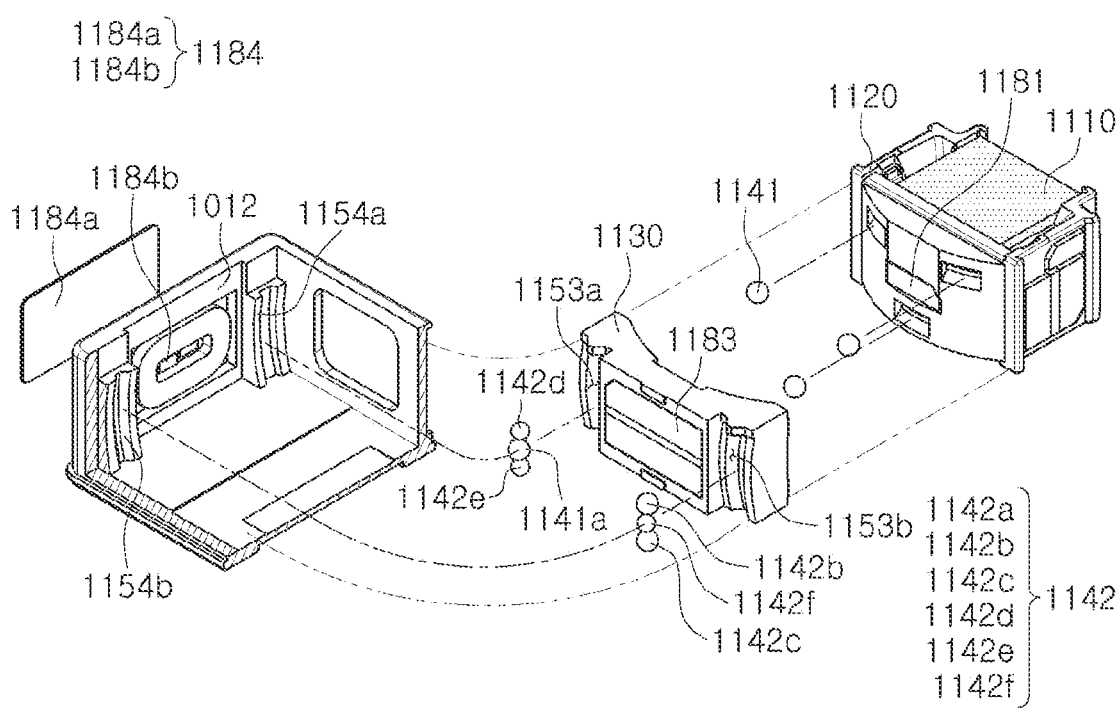
FIG. 21 shows an auxiliary yoke disposed on a side wall of the housing, in an embodiment.
Figure 22:
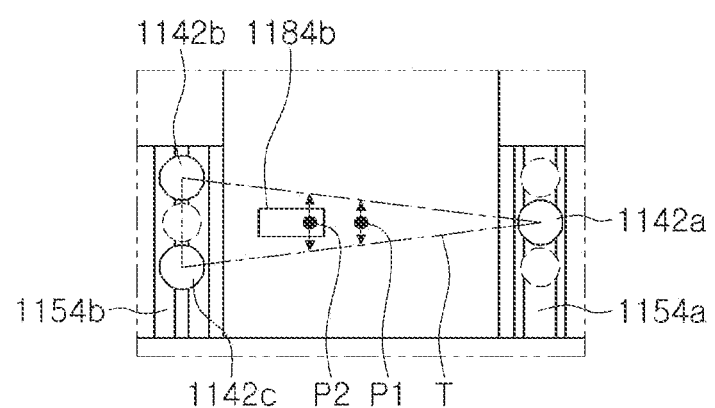
FIG. 22 shows that a center of a pulling force is shifted due to the auxiliary yoke, in an embodiment.

FIG. 21 shows an auxiliary yoke disposed on the side wall 1012 of the housing 1010', in an embodiment. FIG. 22 shows that the center of the pulling force P is shifted due to the auxiliary yoke, in an embodiment.

In an embodiment, the pulling member may allow the center of the pulling force P to be biased to one side of the folded module 1100'. In an embodiment, the fourth magnetic member 1184 may be disposed facing the third magnetic member 1183. Here, the fourth magnetic member 1184 may be asymmetrical.

In an embodiment, the fourth magnetic member 1184 may include a main magnetic member 1184*a* and an auxiliary magnetic member 1184*b*. The main magnetic member 1184*a* and the third magnetic member 1183 may provide a main pulling force, and the auxiliary magnetic member 1184*b* may shift the center of the pulling force to one side of the folded module 1100. For example, the auxiliary magnetic member 1184*b* may be disposed facing an off-center point of the third magnetic member 1183. A center of a magnetic attraction P1 generated between the third magnetic member 1183 and the main magnetic member 1184*a* may be positioned at a center of the third magnetic member 1183, and a center of a magnetic attraction between the third magnetic member 1183 and the auxiliary magnetic member 1184*b* may be positioned at a point biased to one side from the center of the third magnetic member 1183. Accordingly, a center of the magnetic attraction P2 generated between the third magnetic member 1183 and the fourth magnetic member 1184 may be positioned at an off-central point of the third magnetic member 1183.

In an embodiment, the auxiliary magnetic member 1184*b* may be a separate member from the main magnetic member 1184*a*. For example, the main magnetic member 1184*a* may be disposed outside the substrate 1050', and the auxiliary magnetic member 1184*b* may be disposed inside the substrate 1050'. The illustrated embodiment shows that the auxiliary magnetic member 1184*b* is positioned inside the second OIS coil 1172.

In another embodiment, the auxiliary magnetic member 1184*b* is integrally formed with the main magnetic member 1184*a*. For example, the auxiliary magnetic member 1184*b* may be a portion protruding and extended from the main magnetic member 1184a. When the main magnetic member 1184a is disposed outside the substrate 1050, the auxiliary magnetic member 1184b may penetrate through the substrate 1050' and protrude to the inside of the substrate 1050'.

The following description describes an effect of the auxiliary magnetic member 1184b with reference to FIG. 22.

First, without the auxiliary magnetic member 1184b, the center of the pulling force P1 may be positioned in the inner region of the triangle T connecting the three ball members 1142a, 1142b and 1142c to one another, and the center of the pulling force P1 may be vertically moved while the middle guide 1130 (or rotation holder 1120) is rotated about the second axis C2. The middle guide 1130 (or rotation holder 1120) may be stably supported and the OIS function may be smoothly performed only when the center of pulling force P1 is not deviated from the inner region of the triangle T. Therefore, without the auxiliary magnetic member 1184b, the center of the pulling force P1 may be moved in a first range.

With the auxiliary magnetic member 1184b, the center of the pulling force P2 may be shifted to one side of the middle guide 1130, where the two ball members 1142b and 1142c out of the three ball members 1142a, 1142b and 1142c are positioned. It may be assumed that a line connecting the two ball members 1142b with 1142c disposed on the one side of the middle guide 1130 is a base of the triangle T. In this case, the closer the center of the pulling force P2 is positioned to the base of the triangle T, the longer a section in which the center of the pulling force P2 may be vertically moved. That is, the middle guide 1130 (or rotation holder 1120) may have a larger range of rotation about the second axis C2 with the auxiliary magnetic member 1184b than without the auxiliary magnetic member 1184b. As a result, when the auxiliary magnetic member 1184b is additionally provided, the disclosure herein may increase the range in which the rotation holder 1120 (or the reflective member 1110) may be rotated about the second axis, which may improve the performance of the OIS function.

As set forth above, a camera module according to embodiments disclosed herein may obtain a high-quality image by providing a stable optical image stabilization (OIS) function. For example, the camera module may provide excellent performance of the OIS function by controlling an optical element to be stably moved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a housing;
    a rotation holder configured to tilt about an axis perpendicular to an optical axis with respect to the housing, and accommodating a reflective member;
    a plurality of OIS magnets disposed on the rotation holder;
    a first magnetic member disposed on the rotation holder;
    a middle guide disposed between the housing and the rotation holder; and
    a first ball group including three ball members disposed between the rotation holder and the middle guide in arc-shaped guide grooves,
    wherein the plurality of OIS magnets and the first magnetic member are disposed on different surfaces of the rotation holder, and
    wherein an inner region of a triangle connecting the three ball members of the first ball group to one another and the first magnetic member overlap each other in a direction of the optical axis.

2. The camera module of claim 1, further comprising a second magnetic member disposed on the housing or the middle guide to face the first magnetic member.

3. The camera module of claim 2, wherein the first ball group is partially accommodated in a first guide groove disposed in the rotation holder or the middle guide.

4. The camera module of claim 3, wherein the first guide groove is extended in a circumferential direction of a first axis perpendicular to the optical axis.

5. The camera module of claim 4, wherein the first guide groove includes three guide grooves, and the three ball members of the first ball group are respectively accommodated in the three guide grooves.

6. The camera module of claim 1, further comprising a second ball group including three ball members disposed between the housing and the middle guide,
    wherein an inner region of a triangle connecting the three ball members of the second ball group to one another and the first magnetic member overlap each other in the direction of the optical axis.

7. The camera module of claim 6, wherein the second ball group is partially accommodated in a second guide groove disposed in the housing or the middle guide.

8. The camera module of claim 7, wherein the second guide groove is extended in a circumferential direction of a second axis perpendicular to the optical axis.

9. The camera module of claim 7, wherein the three ball members of the second ball group include a first ball member, a second ball member and a third ball member,
    wherein the second guide groove is disposed in the middle guide, and includes a 2-1-th guide groove and a 2-2-th guide groove spaced apart from and parallel to each other, and
    wherein the first ball member and the second ball member are accommodated in the 2-1-th guide groove, and the third ball member is accommodated in the 2-2-th guide groove.

10. The camera module of claim 9, further comprising an auxiliary ball member accommodated in the 2-1-th guide groove and disposed between the first ball member and the second ball member,
    wherein the auxiliary ball member has a diameter smaller than a diameter of the first ball member or the second ball member.

11. The camera module of claim 9, further comprising an auxiliary ball member accommodated in the 2-2-th guide groove and disposed on one side or two sides of the third ball member, wherein the auxiliary ball member has a diameter smaller than a diameter of the third ball member.

12. The camera module of claim 7, wherein the second guide groove includes three guide grooves, and the three ball members of the second ball group are respectively accommodated in the three guide grooves.

13. The camera module of claim 7, further comprising:
a third magnetic member mounted on the rotation holder or the middle guide; and
a fourth magnetic member mounted on the housing to face the third magnetic member.

14. The camera module of claim 13, further comprising a back-yoke mounted on the housing to face the third magnetic member,
wherein the second guide groove is disposed in the housing, and includes a 2-1-th guide groove and a 2-2-th guide groove spaced apart from and parallel to each other,
wherein two ball members among the three ball members of the second ball group are accommodated in the 2-1-th guide groove, and a remaining ball member among the three ball members of the second ball group is accommodated in the 2-2-th guide groove, and
wherein the back-yoke is disposed closer to the 2-1-th guide groove than the 2-2-th guide groove.

15. A camera module, comprising:
a housing;
a rotation holder configured to tilt about an axis perpendicular to an optical axis with respect to the housing, and accommodating a reflective member;
a plurality of OIS magnets disposed on the rotation holder;
a middle guide disposed between the housing and the rotation holder;
a first magnetic member mounted on the rotation holder; and
a ball group including three ball members disposed between the housing and the middle guide,
wherein the plurality of OIS magnets and the first magnetic member are disposed on different surfaces of the rotation holder, and
wherein an inner region of a triangle connecting the three ball members of the ball group to one another and the first magnetic member overlap each other in a direction of the optical axis.

16. The camera module of claim 15, further comprising a second magnetic member mounted on the housing to face the first magnetic member,
wherein the ball group is partially accommodated in a curved guide groove positioned in the housing or the middle guide.

17. A camera module, comprising:
a housing;
a rotation holder accommodating a reflective member and a plurality of OIS magnets;
a first magnetic member disposed on a surface different from surfaces on which the plurality of OIS magnets of the rotation holder are disposed;
a second magnetic member disposed on the housing to face the first magnetic member;
a middle guide disposed between the housing and the rotation holder; and
ball members disposed between the rotation holder and the middle guide or between the housing and the middle guide, and configured to guide tilting of the rotation holder about an axis perpendicular to an optical axis with respect to the housing,
wherein a pulling force generated by the first and second magnetic members is centered at an inner region of a triangle connecting three ball members, among the ball members, to one another.

18. The camera module of claim 17, wherein the pulling force pulls the rotation holder and the middle guide toward the housing.

19. The camera module of claim 17, wherein the ball members are disposed between the rotation holder and the middle guide, and are disposed in arc-shaped guide grooves in the rotation holder or the middle guide.

20. The camera module of claim 17, wherein the ball members are disposed between the housing and the rotation holder, and are disposed in arc-shaped guide grooves in the housing or the rotation holder.

* * * * *